US007338992B2

(12) United States Patent
Pearson et al.

(10) Patent No.: US 7,338,992 B2
(45) Date of Patent: Mar. 4, 2008

(54) POLYOLEFIN COMPOSITIONS

(75) Inventors: Jason Clay Pearson, Kingsport, TN (US); Douglas Stephens McWilliams, Kingsport, TN (US); Gether Irick, Jr., Gray, TN (US); Max Allen Weaver, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/204,864

(22) Filed: Aug. 16, 2005

(65) Prior Publication Data

US 2005/0277715 A1 Dec. 15, 2005

(51) Int. Cl.
C08K 5/34 (2006.01)
(52) U.S. Cl. .................................... 524/99; 524/100
(58) Field of Classification Search .................. 524/99, 524/100
See application file for complete search history.

(56) References Cited

U.S. PATENT DOCUMENTS

| | | |
|---|---|---|
| 3,169,121 A | 2/1965 | Goldberg |
| 3,207,814 A | 9/1965 | Goldberg |
| 3,218,372 A | 11/1965 | Okamura et al. |
| 3,953,539 A | 4/1976 | Kawase et al. |
| 4,025,492 A | 5/1977 | Binsack et al. |
| 4,028,527 A | 6/1977 | Thagard |
| 4,088,709 A | 5/1978 | Seymour et al. |
| 4,136,089 A | 1/1979 | Bier et al. |
| 4,156,069 A | 5/1979 | Prevorsek et al. |
| 4,176,224 A | 11/1979 | Bier et al. |
| 4,188,314 A | 2/1980 | Fox et al. |
| 4,194,038 A | 3/1980 | Baker et al. |
| 4,208,527 A | 6/1980 | Horlbeck et al. |
| 4,238,593 A | 12/1980 | Duh |
| 4,331,586 A | 5/1982 | Hardy |
| 4,374,961 A | 2/1983 | Kudo et al. |
| 4,391,954 A | 7/1983 | Scott |
| 4,393,158 A | 7/1983 | Miller |
| 4,401,804 A | 8/1983 | Wooten et al. |
| 4,429,077 A | 1/1984 | Karrer et al. |
| 4,430,484 A | 2/1984 | Quinn |
| 4,452,932 A | 6/1984 | Brunelle |
| 4,452,933 A | 6/1984 | McCready |
| 4,456,717 A | 6/1984 | Elmers et al. |
| 4,465,820 A | 8/1984 | Miller et al. |
| 4,532,290 A | 7/1985 | Jaquiss et al. |
| 4,587,328 A | 5/1986 | Goldberg |
| 4,619,956 A | 10/1986 | Susi |
| 4,786,692 A | 11/1988 | Allen et al. |
| 4,879,355 A | 11/1989 | Light et al. |
| 4,956,407 A | 9/1990 | Funasaki et al. |
| 4,957,953 A | 9/1990 | Kikkawa et al. |
| 4,981,898 A | 1/1991 | Bassett |
| 5,010,146 A | 4/1991 | Kohsaka et al. |
| 5,011,877 A | 4/1991 | Morris et al. |
| 5,116,905 A | 5/1992 | Belfoure et al. |
| 5,134,181 A | 7/1992 | Masina |
| 5,180,762 A | 1/1993 | Canova |
| 5,194,523 A | 3/1993 | Small, Jr. et al. |
| 5,207,967 A | 5/1993 | Small, Jr. et al. |
| 5,239,020 A | 8/1993 | Morris |
| 5,254,610 A | 10/1993 | Small, Jr. et al. |
| 5,283,295 A | 2/1994 | Light et al. |
| 5,354,791 A | 10/1994 | Gallucci |
| 5,420,212 A | 5/1995 | Light |
| 5,441,997 A | 8/1995 | Walsh et al. |
| 5,461,120 A | 10/1995 | Mason et al. |
| 5,478,896 A | 12/1995 | Scott |
| 5,606,007 A | 2/1997 | Sakashita et al. |
| 5,679,733 A | 10/1997 | Malik et al. |
| 5,714,530 A | 2/1998 | Waterman |
| 5,719,217 A | 2/1998 | Gugumus |
| 5,721,298 A | 2/1998 | Waterman |
| 5,744,526 A | 4/1998 | Goossens et al. |
| 5,744,554 A | 4/1998 | Pfaendner et al. |
| 5,907,026 A | 5/1999 | Factor et al. |
| 5,922,816 A | 7/1999 | Hamilton |
| 5,942,585 A | 8/1999 | Scott et al. |
| 5,965,261 A | 10/1999 | Webster |

(Continued)

FOREIGN PATENT DOCUMENTS

EP 0 272 417 6/1988

(Continued)

OTHER PUBLICATIONS

Anni Berger-Schunn, "Practical Color Measurement," 1994, pp. 39-56, 91-98, Wiley, NY.

(Continued)

Primary Examiner—Peter D. Mulcahy
(74) Attorney, Agent, or Firm—Bernard J. Graves, Jr.; B.J. Boshears; Louis N. Moreno

(57) ABSTRACT

This invention relates to a polyolefin composition comprising (A) at least one polyolefin prepared in the presence of at least one Ziegler Natta; (B) a salt comprising at least one suitable phosphorus-containing acid and at least one suitable basic organic compound, such as a hindered amine light stabilizer; (C) at least one phenolic species selected from one or more phenolic compounds selected from phenolic antioxidants and ultraviolet light absorbers.

25 Claims, No Drawings

U.S. PATENT DOCUMENTS

| | | | |
|---|---|---|---|
| 5,965,643 | A | 10/1999 | Gugumus |
| 6,005,059 | A | 12/1999 | Scott et al. |
| 6,011,124 | A | 1/2000 | Scott et al. |
| 6,037,424 | A | 3/2000 | Scott et al. |
| 6,043,322 | A | 3/2000 | Scott et al. |
| 6,051,164 | A | 4/2000 | Samuels |
| 6,077,890 | A | 6/2000 | Hudson et al. |
| 6,103,796 | A | 8/2000 | Stanick et al. |
| 6,107,375 | A | 8/2000 | Krishman et al. |
| 6,114,420 | A | 9/2000 | Zedda et al. |
| 6,221,556 | B1 | 4/2001 | Gallucci et al. |
| 6,254,950 | B1 | 7/2001 | Rogers et al. |
| 6,306,939 | B1 | 10/2001 | Gupta et al. |
| 6,310,140 | B1 * | 10/2001 | Raetzsch et al. ............ 525/191 |
| 6,323,291 | B1 | 11/2001 | Mason et al. |
| 6,333,113 | B2 | 12/2001 | Sugie et al. |
| 6,348,591 | B1 | 2/2002 | Gupta et al. |
| 6,455,616 | B1 | 9/2002 | Cogen |
| 6,469,083 | B1 | 10/2002 | Opalko |
| 6,476,158 | B1 | 11/2002 | England et al. |
| 6,500,887 | B1 | 12/2002 | Tobita et al. |
| 6,509,399 | B2 | 1/2003 | Gupta et al. |
| 6,545,073 | B1 | 4/2003 | Blount |
| 6,569,957 | B2 | 5/2003 | Williams et al. |
| 6,653,474 | B1 * | 11/2003 | Kersjes et al. .............. 544/195 |
| 6,727,303 | B2 | 4/2004 | Ono et al. |
| 6,780,917 | B2 | 8/2004 | Hashimoto et al. |
| 2002/0086953 | A1 | 7/2002 | Williams et al. |
| 2002/0128357 | A1 | 9/2002 | Gossens et al. |
| 2004/0143041 | A1 | 7/2004 | Pearson et al. |

FOREIGN PATENT DOCUMENTS

| | | |
|---|---|---|
| EP | 0 294 862 | 12/1988 |
| EP | 0 295 730 | 12/1988 |
| EP | 0 466 137 A2 | 1/1992 |
| EP | 0 438 488 A1 | 5/1992 |
| EP | 0 483 488 A1 | 5/1992 |
| EP | 0 537 837 A1 | 4/1993 |
| EP | 0 543 125 | 5/1993 |
| EP | 0 661 342 A1 | 7/1995 |
| EP | 0 675 159 A1 | 10/1995 |
| EP | 1 304 351 | 4/2003 |
| GB | 1466154 | 3/1977 |
| GB | 1466261 | 3/1977 |
| JP | 04-059852 | 6/1990 |
| JP | 04-011660 | 1/1992 |
| JP | 04-059852 | 2/1992 |
| JP | 10-001602 | 1/1998 |
| JP | 10-298439 | 11/1998 |
| WO | WO 02/053633 A2 | 7/2002 |
| WO | WO 2004/065472 A1 | 8/2004 |

OTHER PUBLICATIONS

"Plastics Adhesive Handbook," 5$^{th}$ Ed, 2001, pp. 98-108, Hanser Gradner Publs., Inc., Cincinnati, OH.

Hiemenz, "Polymer Chemistry," 1984, pp. 488-495, Marcel Dekker, NY.

Pospisil et al., "Handbook of Polymer Degradation," 2$^{nd}$ ED, 2000, pp. 241-242, S. Halim Hamid Ed., Marcel Dekker, NY.

Manas Chanda, "Advanced Polymer Chemistry," 2000, pp. 742-755 and 791-796, Marcel Dekker, NY.

Wilfong, "Linear Polyesters," *Journal of Polymer Science*, 1961, pp. 385-410, 54.

USPTO Office Action dated Nov. 3, 2005, for U.S. Appl. No. 11/204,864.

USPTO Office Action dated Oct. 6, 2004, for U.S. Appl. No. 10/379,783.

USPTO Office Action dated May 4, 2005, for U.S. Appl. No. 10/379,783.

USPTO Office Action dated Dec. 7, 2004, for U.S. Appl. No. 10/379,649.

USPTO Office Action dated Aug. 3, 2004, for U.S. Appl. No. 10/379,649.

USPTO Office Action dated Aug. 5, 2003, for U.S. Appl. No. 10/382,013.

USPTO Office Action dated Aug. 2, 2004, for U.S. Appl. No. 10/393,475.

USPTO Office Action dated Dec. 7, 2004, for U.S. Appl. No. 10/393,475.

USPTO Office Action dated Oct. 25, 2005, for U.S. Appl. No. 10/392,575.

Copending U.S. Appl. No. 11/204,869, filed Aug. 16, 2005.
Copending U.S. Appl. No. 11/204,460, filed Aug. 16, 2005.
Copending U.S. Appl. No. 10/639,712, filed Mar. 5, 2003.
Copending U.S. Appl. No. 11/204,870, filed Aug. 16, 2005.
Copending U.S. Appl. No. 10/772,121, filed Feb. 4, 2004.
Copending U.S. Appl. No. 11/204,461, filed Aug. 16, 2005.
Copending U.S. Appl. No. 11/204,867, filed Aug. 16, 2005.
Copending U.S. Appl. No. 10/392,575, filed Mar. 20, 2003.

* cited by examiner

POLYOLEFIN COMPOSITIONS

RELATED APPLICATIONS

This application claims priority to and the benefit of the following applications; U.S. patent Ser. No. 10/379,783 filed Mar. 5, 2003, incorporated herein by reference.

FIELD OF THE INVENTION

This invention relates to a polyolefin composition comprising (A) at least one polyolefin; (B) a salt comprising at least one suitable phosphorus-containing acid and at least one suitable basic organic compound, such as a hindered amine light stabilizer (HALS); and (C) at least one phenol-containing compound.

BACKGROUND OF THE INVENTION

Methods for deactivating metallic catalyst residues in polymers are known in the art; however, it is desirable to find improved methods for deactivating such residues in order to provide compositions with better color, and less batch-to-batch variation in color.

The most widely-used catalysts for the preparation of stereoregular polyolefins are the Ziegler-Natta bicomponent catalysts. These compositions generally include titanium, vanadium, zirconium, chromium, molybdenum or copper halides in combination with an organometallic compound. [P. C. Hiemenz, "Polymer Chemistry", Marcel Dekker, NY, pp 488-495 (1984)]. The Ziegler-Natta catalysts exist in many different forms. Most commonly, the catalyst consists of two components, a transition metal compound from groups IVB to VIIIB, in combination with an organometallic compound from groups I to III of the periodic table of elements. Many variations of Ziegler-Natta catalysts have been reported. They may be unsupported, supported on suitable insoluble supports, homogeneous, metallocenes and the like. These are discussed in detail by Manas Chanda in "Advanced Polymer Chemistry", Marcel Dekker, NY, 2000, pp 742-755 and 791-796. All of these catalyst variations are recognized to exist under the definition of Ziegler-Natta catalysts.

Corrosion of metal process equipment is an additional source of metals in polyolefins. For example, 304 and 316 stainless steels contain iron, manganese, chromium and nickel ["Handbook of Chemistry and Physics, 63rd Edition", R. C. Weast, Editor, CRC Press, Boca Raton, Fla., pp F-120-F121 (1982)]. The metals from catalyst residues and from corrosion of process equipment can interact with phenolic compounds (antioxidants and ultraviolet stabilizers) used to stabilize the polyolefins during melt-processing, or added to provide improved performance in some end-use application. The phenol-metal complexes are frequently colored, requiring the use of acidic phosphorus compounds as stabilizers to provide acceptable appearance. Acidic phosphorous compounds are typically undesirable in polymers because they can corrode process equipment and form insoluble precipitates with other additives in the polymer [Jan Pospisil and Stanislav Nespurek, "Handbook of Polymer Degradation, 2nd ed., S. Halim Hamid ed., Marcel Dekker, NY, pp 241-242 (2000)].

Polyolefins, including low-density polyethylene, linear-low-density polyethylene, polypropylene and polybutene undergo undesirable oxidation when melt processed in the presence of air. Antioxidants, especially those containing phenol functionality, are widely used to inhibit oxidation during melt-processing, and during end-uses. Many ultraviolet stabilizers also have phenolic functionality. Interaction of these phenolic compounds with metal catalyst residues and with corrosion metals can introduce color into the polyolefins. It would be desirable to develop an additive for improving the color of polyolefins.

SUMMARY OF THE INVENTION

It has been discovered that that the presence of a salt, made by the reaction of a basic organic compound and a phosphorus-containing acid, in polyolefin compositions can significantly reduce the deleterious effects of the phenol/metal interactions thereby providing better color, and less batch-to-batch variation in color.

Thus, the present invention provides a polyolefin composition comprising: (A) at least one polyolefin prepared in the presence of at least one Ziegler-Natta catalyst; (B) at least one salt prepared by the reaction of one or more acidic phosphorus-containing compounds with one or more basic organic compounds which contain nitrogen; and (C) a phenol-containing molecule.

Another embodiment of the present invention is a polyolefin concentrate comprising: (A) at least one polyolefin prepared in the presence of at least one Ziegler-Natta catalyst; and (B) up to about 10 weight percent, preferably about 5 to 10 weight percent based on the total weight of the polyolefin of at least one salt prepared by the reaction of one or more acidic phosphorus-containing compounds and one or more basic organic compounds which contain nitrogen.

The salts useful in the invention unexpectedly provides improved color to polyolefins that contain phenolic compounds relative to that observed in the absence of the salt.

DETAILED DESCRIPTION OF THE INVENTION

The present invention provides a polyolefin composition comprising:

(A) at least one polyolefin prepared in the presence of at least one Ziegler-Natta catalyst; and (B) a salt prepared by the reaction of one or more acidic phosphorus-containing compounds with one or more basic organic compounds preferably containing nitrogen, wherein the phosphorus-containing compounds are selected from compounds having the formulas:

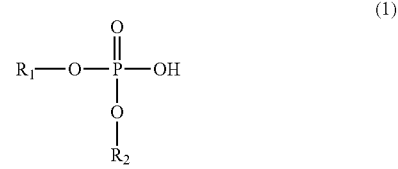

(1)

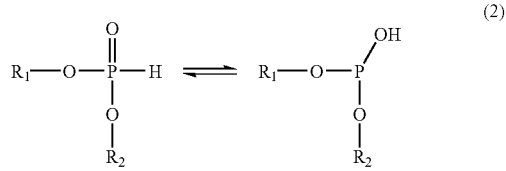

(2)

-continued
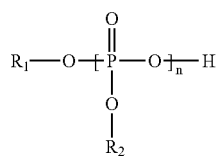
(3)
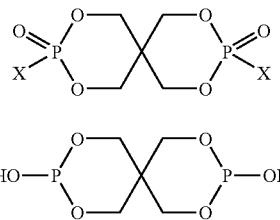
(4)
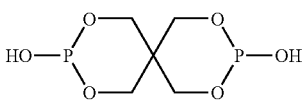
(5)
wherein
$R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
n is 2 to 500; and
X is selected from hydrogen and hydroxy;
and wherein the basic organic compounds are selected from compounds having the formulas:
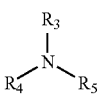
(1)
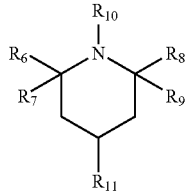
(2)
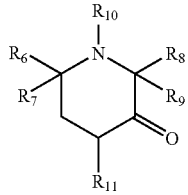
(3)
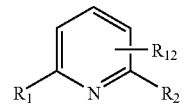
(4)
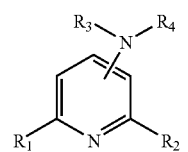
(5)
-continued
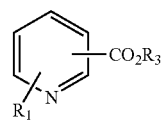
(6)
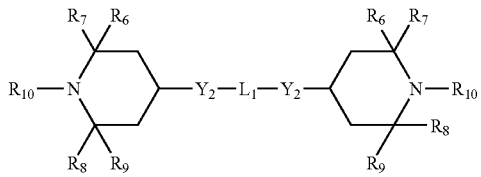
(7)
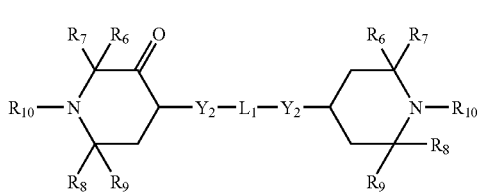
(8)
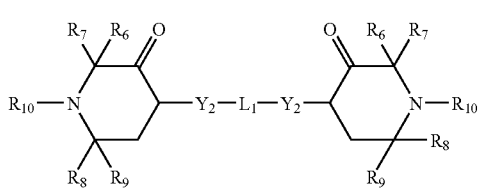
(9)
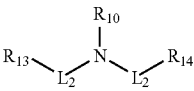
(10)
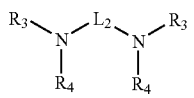
(11)
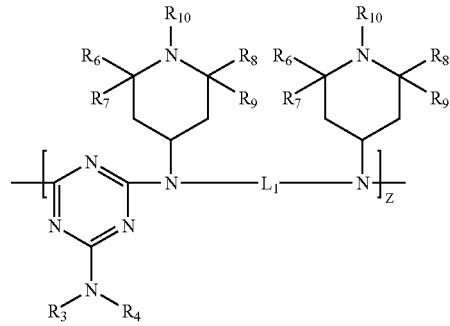
(12)
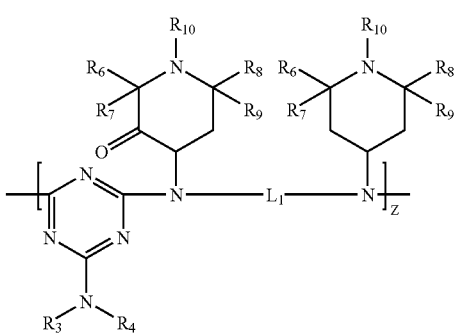
(13)

-continued

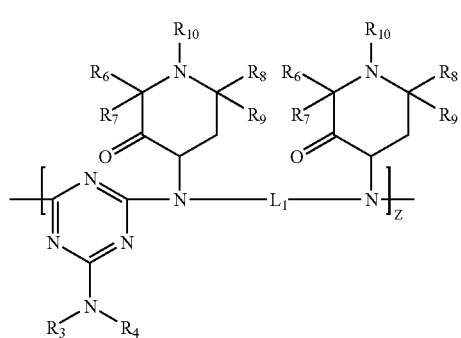
(14)

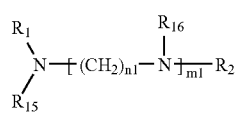
(15)

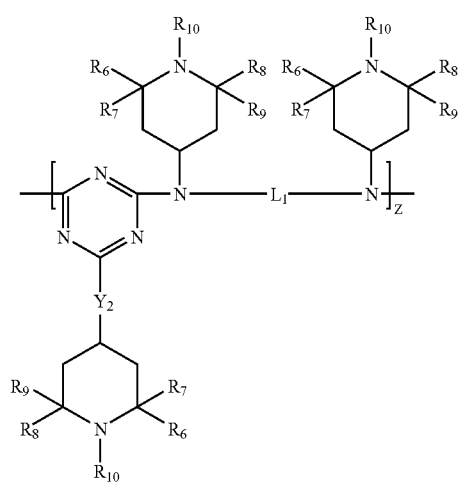
(16)

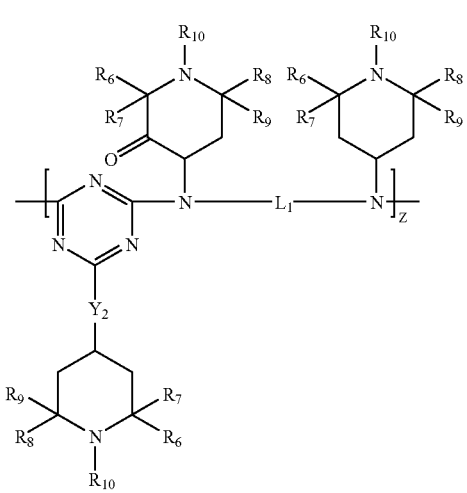
(17)

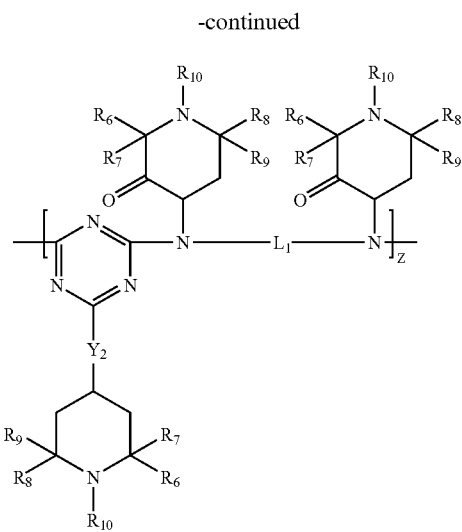
(18)

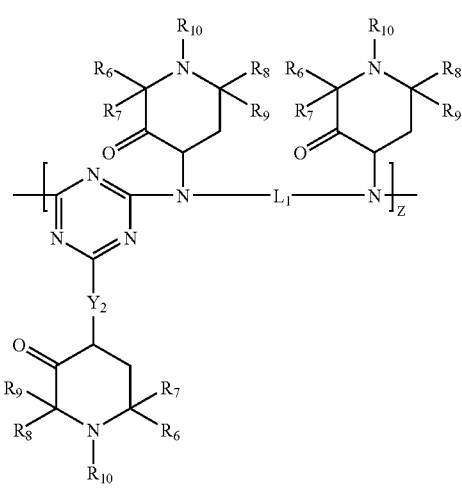
(19)

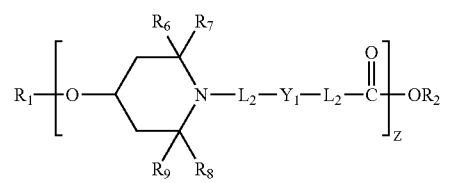
(20)

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$, $R_4$, and $R_5$ is a substituent other than hydrogen; $R_3$ and $R_4$ or $R_4$ and $R_5$ may collectively may represent a divalent group forming a ring with the nitrogen atom to which they are attached, e.g., morpholino, piperidino and the like;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;

$R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;

$R_{11}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or a succinimido group having the formula

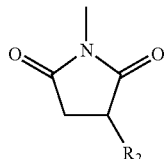

$R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 2, 3 or 4 positions on the aromatic ring of the nitrogen-containing compounds of formula 4;

the —$N(R_3)(R_4)$ group may be located at the 2, 3 or 4 positions on the pyridine ring of the nitrogen-containing compounds of formula (5);

the —$CO_2R_3$ and $R_1$ groups may be located at any of the 2, 3, 4, 5, 6 positions of the pyridine ring of the nitrogen-containing compounds of formula (6);

$L_1$ is a divalent linking group selected from $C_2$-$C_{22}$-alkylene, —$(CH_2CH_2$—$Y_1)_{1-3}$—$CH_2CH_2$—, $C_3$-$C_8$-cycloalkylene, arylene, or —$CO$-$L_2$-$OC$—;

$L_2$ is selected from $C_1$-$C_{22}$-alkylene, arylene, —$(CH_2CH_2$—$Y_1)_{1-3}$—$CH_2CH_2$— and $C_3$-$C_8$-cycloalkylene;

$Y_1$ is selected from —$OC(O)$—, —$NHC(O)$—, —$O$—, —$S$—, —$N(R_1)$—;

$Y_2$ is selected from —$O$— or —$N(R_1)$—;

$R_{13}$ and $R_{14}$ are independently selected from —$O$—$R_2$ and —$N(R_2)_2$;

Z is a positive integer of up to about 20, preferably up to about 6;

m1 is selected from 0 to about 10;

n1 is a positive integer selected from 2 to about 12;

$R_{15}$, and $R_{16}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

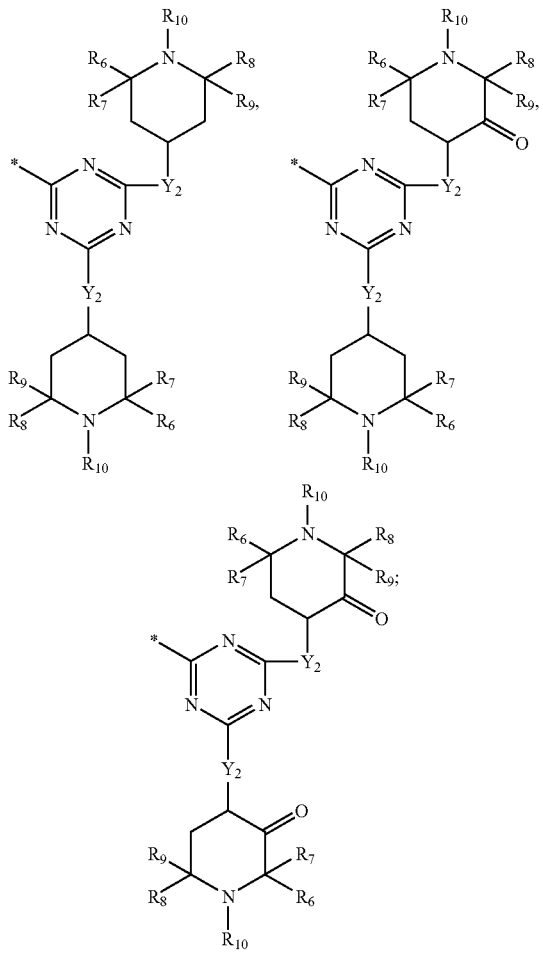

Radical A structures wherein * designates the position of attachment preferably at least one of $R_{15}$ and $R_{16}$ is an A radical; and wherein the ratio of the number of phosphorus atoms in the acidic phosphorus-containing compound to the number of basic nitrogen atoms in the basic organic compound is about 0.05 to about 2, preferably from about 0.25 to about 1.1;

(C) an ultraviolet light absorber and/or phenolic antioxidant selected from compounds having the formula:

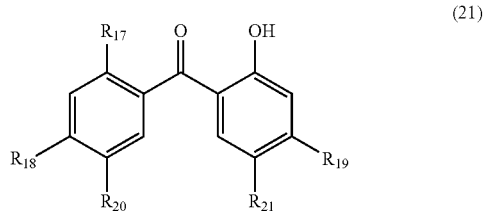

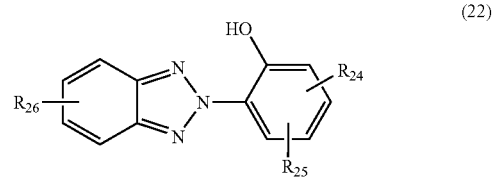

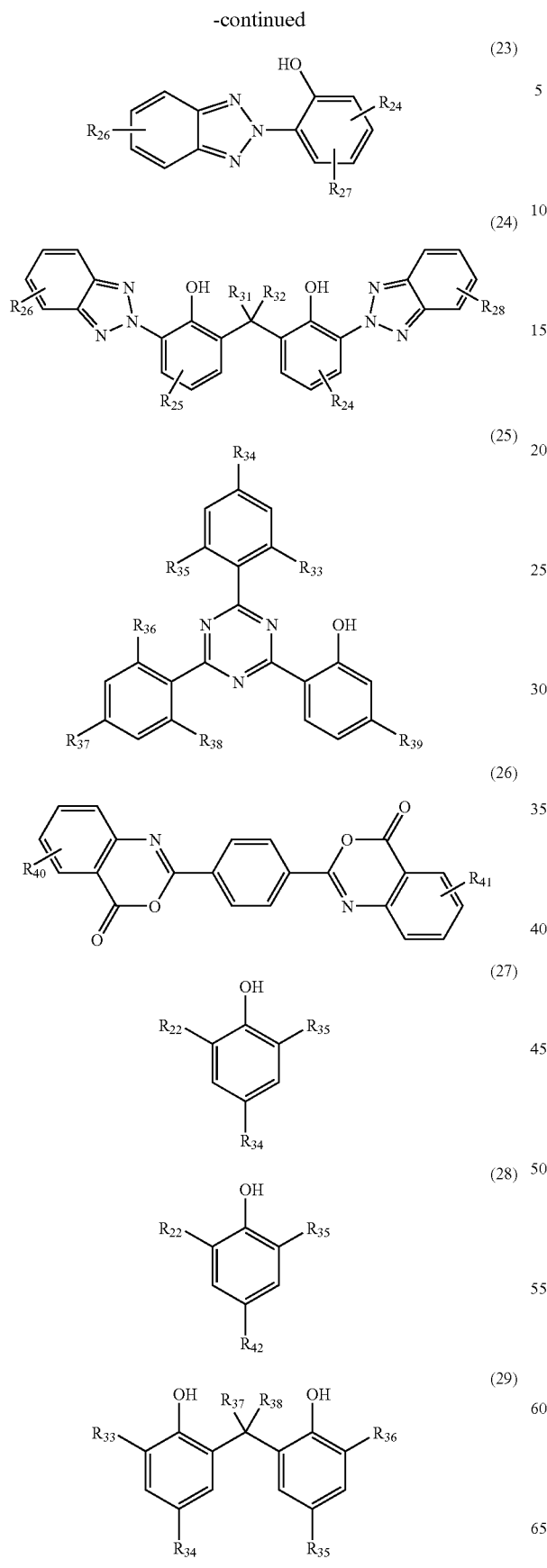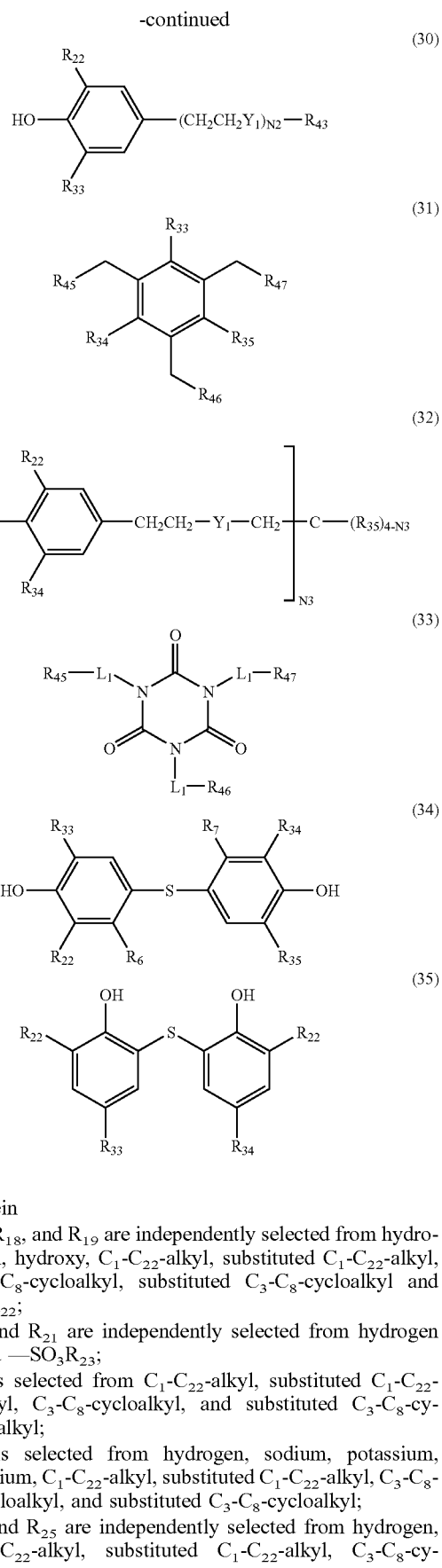

wherein
R$_{17}$, R$_{18}$, and R$_{19}$ are independently selected from hydrogen, hydroxy, C$_1$-C$_{22}$-alkyl, substituted C$_1$-C$_{22}$-alkyl, C$_3$-C$_8$-cycloalkyl, substituted C$_3$-C$_8$-cycloalkyl and OR$_{22}$;

R$_{20}$ and R$_{21}$ are independently selected from hydrogen and —SO$_3$R$_{23}$;

R$_{22}$ is selected from C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{23}$ is selected from hydrogen, sodium, potassium, lithium, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{24}$ and R$_{25}$ are independently selected from hydrogen, C$_1$-C$_{22}$-alkyl, substituted C$_1$-C$_{22}$-alkyl, C$_3$-C$_8$-cycloalkyl, substituted $C_3$-$C_8$-cycloalkyl and may be located at the 3', 4', 5' or 6' positions on the aromatic ring;

$R_{26}$ and $R_{28}$ are independently selected from hydrogen, halogen, $C_1$-$C_{22}$-alkyl, substituted $C_1$-$C_{22}$-alkyl, $C_3$-$C_8$-cycloalkyl, substituted $C_3$-$C_8$-cycloalkyl, and may be located at the 4, 5, 6 or 7 positions on the aromatic ring;

wherein $R_{27}$ is selected from —$(CH_2CH_2$—$Y1)_{N2}$—$CH_2CH_2$—$R_{29}$, a group having the formula

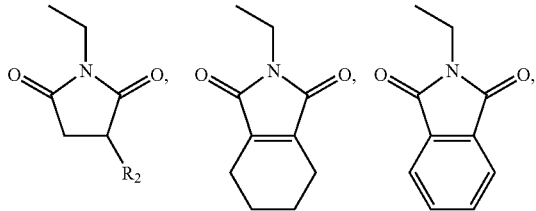

and may be located at the 3', 4', 5' or 6' positions on the aromatic ring;

$R_{29}$ is selected from hydrogen, hydroxy and —$CO_2R_{30}$;

$R_{30}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, aryl, and heteroaryl;

$R_{31}$ and $R_{32}$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{33}$, $R_{34}$, $R_{35}$, $R_{36}$, $R_{37}$, and $R_{38}$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{39}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$OR_{30}$;

$R_{40}$ and $R_{41}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and may be located at the 5, 5', 6, 6', 7, 7', 8 or 8' positions on the aromatic ring, respectively;

$R_{42}$ is —$(CH_2CH_2$—$Y_1)_{N2}$—$R_{29}$;

$R_{43}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$;

$R_{44}$ is a group having the formula

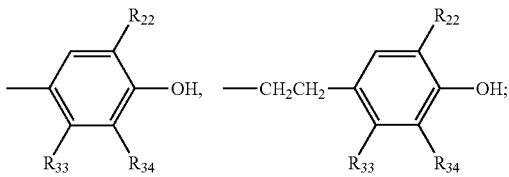

$R_{45}$, $R_{46}$ and $R_{47}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$ and at least one of $R_{45}$, $R_{46}$ or $R_{47}$ is —$R_{44}$;

$L_1$ is a divalent linking group selected from $C_2$-$C_{22}$-alkylene, —$(CH_2CH_2$—$Y_1)_{1-3}$—$CH_2CH_2$—, $C_3$-$C_8$-cycloalkylene, arylene, or —$CO$-$L_2$-$OC$—;

$L_2$ is selected from $C_1$-$C_{22}$-alkylene, arylene, —$(CH_2CH_2$—$Y_1)_{1-3}$—$CH_2CH_2$— and $C_3$-$C_8$-cycloalkylene;

$Y_1$ is selected from —$OC(O)$—, —$NHC(O)$—, —$O$—, —$S$—, —$N(R_1)$—;

N2 is a positive integer selected from 1 to about 20;

N3 is an positive integer from 1 to 4;

The term "$C_1$-$C_{22}$-alkyl" denotes a saturated hydrocarbon radical which contains one to twenty-two carbons and which may be straight or branched-chain. Such $C_1$-$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$-$C_{22}$-alkyl" refers to $C_1$-$C_{22}$-alkyl radicals as described above which may be substituted with one or more substituents selected from hydroxy, halogen, cyano, aryl, heteroaryl, $C_3$-$C_8$-cycloalkyl, substituted $C_3$-$C_8$-cycloalkyl, $C_1$-$C_6$-alkoxy, $C_2$-$C_6$ alkanoyloxy and the like.

The term "$C_3$-$C_8$-cycloalkyl" is used to denote a cycloaliphatic hydrocarbon radical containing three to eight carbon atoms. The term "substituted $C_3$-$C_8$-cycloalkyl" is used to describe a $C_3$-$C_8$-cycloalkyl radical as detailed above containing at least one group selected from $C_1$-$C_6$-alkyl, $C_1$-$C_6$-alkoxy, hydroxy, halogen, and the like.

The term "aryl" is used to denote an aromatic radical containing 6, 10 or 14 carbon atoms in the conjugated aromatic ring structure and these radicals substituted with one or more groups selected from $C_1$-$C_6$-alkyl; $C_1$-$C_6$-alkoxy; phenyl, and phenyl substituted with $C_1$-$C_6$-alkyl; $C_1$-$C_6$-alkoxy; halogen and the like; $C_3$-$C_8$-cycloalkyl; halogen; hydroxy, cyano, trifluoromethyl and the like. Typical aryl groups include phenyl, naphthyl, phenylnaphthyl, anthryl(anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2- and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3,4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$-$C_6$-alkoxy" and "$C_2$-$C_6$-alkanoyloxy" are used to represent the groups —$O$—$C_1$-$C_6$-alkyl and —$OCOC_1$-$C_6$-alkyl, respectively, wherein "$C_1$-$C_6$-alkyl" denotes a saturated hydrocarbon that contains 1-6 carbon atoms, which may be straight or branched-chain, and which may be further substituted with one or more groups selected from halogen, methoxy, ethoxy, phenyl, hydroxy, acetyloxy and propionyloxy. The term "halogen" is used to represent fluorine, chlorine, bromine, and iodine; however, chlorine and bromine are preferred.

The term "$C_2$-$C_{22}$-alkylene" is used to denote a divalent hydrocarbon radical that contains from two to twenty-two carbons and which may be straight or branched chain and which may be substituted with one or more substituents selected from hydroxy, halogen, $C_1$-$C_6$-alkoxy, $C_2$-$C_6$-alkanolyloxy and aryl. The term "$C_3$-$C_8$-cycloalkylene" is used to denote divalent cycloaliphatic radicals containing three to eight carbon atoms and these are optionally substituted with one or more $C_1$-$C_6$-alkyl groups. The term "arylene" is used to denote 1,2-, 1,3-, and 1,4-phenylene radicals and these optionally substituted with $C_1$-$C_6$-alkyl, $C_1$-$C_6$-alkoxy and halogen.

The salt of component (B) of the novel compositions provided by the present invention may be prepared by bringing together the acidic phosphorus-containing compound and the basic nitrogen-containing organic compound in a suitable manner. A suitable manner is any procedure that involves contacting the acidic phosphorus-containing acid with the basic organic compound. For example, the acidic phosphorus-containing compound and the basic nitrogen-containing organic compound may be dissolved in an appropriate solvents and the solutions mixed followed by precipitation of the reaction product; mixing the phosphorus-containing acid and the basic organic compound without solvent; and the like.

The ratio of the number of phosphorus atoms in the acidic phosphorus-containing compound to the number of basic nitrogen atoms in the basic organic compound may be in the range of about 0.05 to about 2, preferably from about 0.25 to about 1.1. Compositions that contain a large excess of unreacted phosphorus-containing acidic compounds may result in corrosion of process equipment during concentrate manufacture and have a negative effect on process equipment.

The salt or salts constituting component (B) of our novel compositions typically is present in concentrations ranging from about 0.1 to about 1.8 weight percent based on the total weight of the composition, i.e., the total weight of the component (A) polyolefin, the salt and any additional components present such as a, stabilizers and colorants. Concentrations of salt (B) within this range typically are effective to improve the color of pololefins compositions that contain phenolic species such as UV absorbers and or phenolic antioxidants. The concentration of the salt(s) preferably is about 0.05 to 1.5 weight percent (same basis). The polyolefin of component (A) typically contains catalyst metal in concentrations of less than about 200 parts per million by weight (ppmw), e.g., about 0.05 to 200 ppmw. Metal catalyst residues concentrations of about 0.5 to 10 ppmw are more typical. Corrosion of metal process equipment is an additional source of metal contaminants in polyolefin component (A). For example, 304 and 316 stainless steels contain iron, manganese, chromium and nickel.

The acidic phosphorus-containing compounds preferably are phosphorous acid, phosphoric acid and polyphosphoric acid, most preferably phosphorous acid.

Examples of suitable basic organic compounds include alkyl amines such as triethylamine and 2,2,6,6-tetramethylpiperidine, pyridine and substituted pyridines, piperidine and substituted piperidines, morpholine and substituted morpholines and the like. The preferred basic organic compounds are hindered amine light stabilizers (HALS) such as: Cyasorb UV-3346 (Cytec Industries, CAS# 90751-07-8), Cyasorb UV-3529 (Cytec Industries, CAS# 219920-30-6), Cyasorb UV-3641 (Cytec Industries, CAS# 106917-30-0), Cyasorb UV-3581 (Cytec Industries, CAS# 79720-19-7), Cyasorb UV-3853 (Cytec Industries, CAS# 167078-06-0), Cyasorb UV-3853S (Cytec Industries, CAS# 24860-22-8), Tinuvin 622 (Ciba Specialty Chemicals, CAS# 65447-77-0), Tinuvin 770 (Ciba Specialty Chemicals, CAS# 52829-07-9), Tinuvin 144 (Ciba Specialty Chemicals, CAS# 63843-89-0), Tinuvin 123 (Ciba Specialty Chemicals, CAS# 129757-67-1), Chimassorb 944 (Ciba Specialty Chemicals, CAS# 71878-19-8), Chimassorb 119 (Ciba Specialty Chemicals, CAS# 106990-43-6), Chimassorb 2020 (Ciba Specialty Chemicals, CAS# 192268-64-7), Lowilite 76 (Great Lakes Chemical Corp., CAS# 41556-26-7), Lowilite 62 (Great Lakes Chemical Corp., CAS# 65447-77-0), Lowilite 94 (Great Lakes Chemical Corp., CAS# 71878-19-8), Uvasil 299LM (Great Lakes Chemical Corp., CAS# 182635-99-0), and Uvasil 299HM (Great Lakes Chemical Corp., CAS# 182635-99-0), Dastib 1082 (Vocht a.s., CAS# 131290-28-3), Uvinul 4049H (BASF Corp., CAS# 109423-00-9), Uvinul 4050H (BASF Corp., CAS# 124172-53-8), Uvinul 5050H (BASF Corp., CAS# 199237-39-3), Mark LA 57 (Asahi Denka Co., Ltd., CAS# 64022-61-3), Mark LA 52 (Asahi Denka Co., Ltd., CAS# 91788-83-9), Mark LA 62 (Asahi Denka Co., Ltd., CAS# 107119-91-5), Mark LA 67 (Asahi Denka Co., Ltd., CAS# 100631-43-4), Mark LA 63 (Asahi Denka Co., Ltd. Co., Ltd. Co., CAS# 115055-30-6), Mark LA 68 (Asahi Denka Co., Ltd., CAS# 100631-44-5), Hostavin N 20 (Clariant Corp., CAS# 95078-42-5), Hostavin N 24 (Clariant Corp., CAS# 85099-51-1, CAS# 85099-50-9), Hostavin N 30 (Clariant Corp., CAS# 78276-66-1), Diacetam-5 (GTPZAB Gigiena Truda, USSR, CAS# 76505-58-3), Uvasorb-HA 88 (3V Sigma, CAS# 136504-96-6), Goodrite UV-3034 (BF Goodrich Chemical Co., CAS# 71029-16-8), Goodrite UV-3150 (BF Goodrich Chemical Co., CAS# 96204-36-3), Goodrite UV-3159 (BF Goodrich Chemical Co., CAS# 130277-45-1), Sanduvor 3050 (Clariant Corp., CAS# 85099-51-0), Sanduvor PR-31 (Clariant Corp., CAS# 147783-69-5), UV Check AM806 (Ferro Corp., CAS# 154636-12-1), Sumisorb TM-061(Sumitomo Chemical Company, CAS# 84214-94-8), Sumisorb LS-060 (Sumitomo Chemical Company, CAS# 99473-08-2), Uvasil 299 LM (Great Lakes Chemical Corp., CAS# 164648-93-5), Uvasil 299 HM (Great Lakes Chemical Corp., CAS# 164648-93-5), Nylostab S-EED (Clariant Corp., CAS# 42774-15-2). Additional preferred hindered amine light stabilizers may be listed in the *Plastic Additives Handbook 5th Edition* (Hanser Gardner Publications, Inc., Cincinnati, Ohio, USA, 2001).

The hindered amine light stabilizers having above formulas (2), (3), (7), (8), (9), (12), (13), (14), (15), (16), (17), (18), (19) and (20) represent the preferred basic compounds. Chimassorb 944 (Ciba Specialty Chemicals, CAS# 71878-19-8), Cyasorb UV-3529 (Cytec Industries, CAS# 219920-30-6), Chimassorb 119 (Ciba Specialty Chemicals, CAS# 106990-43-6) and Tinuvin 770 (Ciba Specialty Chemicals, CAS# 52829-07-9) and any equivalents thereof are specific examples of the preferred basic compounds. A more preferred group of the basic nitrogen compounds are the hindered amine light stabilizers having above formulas (2), (3), (7), (8), (9), (12), (13), (14), (16), (17), (18) and (19) wherein radical $R_{10}$ is hydrogen or $C_1$-$C_{22}$ alkyl and formula (15) wherein at least one of $R_{15}$ and $R_{16}$ represents radical A wherein $R_{10}$ is hydrogen or $C_1$-$C_{22}$ alkyl. The most preferred are high molecular weight HALS wherein the molecular weight is greater than about 1000 such as Cyasorb UV-3529 (Cytec Industries, CAS# 219920-30-6). The most preferred HALS correspond to formula (12) set forth above wherein $R_6$=$R_7$=$R_8$=$R_9$=$R_{10}$=methyl, $(R_3)(R_4)N$— collectively represent morpholino, $L_1$ is $C_1$ to $C_6$ alkylene, and Z is 1 to 6.

The polyolefins useful in this invention may be prepared from ethylenically unsaturated monomer that contain from 2 to 16 carbon atoms. Included herein are homopolymers, copolymers, terpolymers, and the like. Preferred polyolefins include linear low density, low density, medium and high density polyethylenes and polypropylene. Particularly preferred for preparation herein by the process of the present invention are polyethylenes. Such polyethylenes are defined as homopolymers of ethylene and copolymers of ethylene and at least one alpha-olefin wherein the ethylene content is at least about 50 percent by weight of the total monomers involved. Polyethylene having a density in the range of from about 0.9 grams/cc to about 0.98 grams/cc, preferably, a density in the range of from about 0.910 grams/cc to about 0.965 grams/cc, are particularly preferred. Exemplary alpha-olefins that may be utilized herein are propylene, 1-butene, 1-pentene, 1-hexene, 1-heptene, 1-octene, 4-methyl-1-pentene, 1-decene, 1-dodecene, 1-hexadecene and the like. Also utilizable herein are polyenes such as 1,3-hexadiene, 1,4-hexadiene, 1,5-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of polyethylenes containing long chain branching may occur. It is understood that these polyolefins may contain property-modifying amounts of other polymers and/or modifying amounts of other copolymerized monomers, including, but not limited to, vinyl stearate, vinyl acetate, acrylic acid, methyl acrylate, ethyl acrylate, methacrylic acid, methyl methacrylate, butadiene, isoprene and the like.

The polymerization reaction of the present invention is carried out in the presence of at least one Ziegler-Natta catalyst. In the process of the invention, the catalyst can be introduced in any manner known in the art. For example, the catalyst can be introduced directly into the fluidized bed reactor in the form of a solution, a slurry or a dry free flowing powder. The catalyst can also be used in the form of a deactivated catalyst, or in the form of a prepolymer obtained by contacting the catalyst with one or more olefins.

The Ziegler-Natta catalysts utilized herein are well known in the industry. The Ziegler-Natta catalysts in the simplest form are comprised of a component comprising at least one transition metal and a co-catalyst comprising at least one organometallic compound. The metal of the transition metal component is a metal of Groups 4, 5, 6, 7, 8, 9 and 10 of the Periodic Table of the Elements, as published in "Chemical and Engineering News", 63(5), 27, 1985. In this format, the groups are numbered 1-18. Exemplary of such transition metals are titanium, zirconium, vanadium, chromium, manganese, iron, cobalt, nickel, and the like, and mixtures thereof. In a preferred embodiment the transition metal is selected from the group consisting of titanium, zirconium, vanadium and chromium, and in a still further preferred embodiment, the transition metal is titanium. The Ziegler-Natta catalyst can optionally contain magnesium and/or chlorine. Such magnesium and chlorine containing catalysts may be prepared by any manner known in the art.

The co-catalyst used in the process of the present invention can be any organometallic compound, or mixtures thereof, that can activate the transition metal component in a Ziegler-Natta catalyst in the polymerization of olefins. In particular, the organometallic co-catalyst compound that is reacted with the transition metal component contains a metal of Groups 1, 2, 11, 12, 13 and/or 14 of the above described Periodic Table of the Elements. Exemplary of such metals are lithium, magnesium, copper, zinc, boron, silicon and the like, and mixtures thereof.

Preferably the co-catalyst is at least one compound of the formula, $X_n ER_{3-n}$, or mixtures thereof, wherein, X is hydrogen, halogen, or mixtures of halogens, selected from fluorine, chlorine, bromine and iodine; n ranges from 0 to 2; E is an element from Group 13 of the Periodic Table of Elements such as boron, aluminum and gallium; and R is a hydrocarbon group, containing from 1 to 100 carbon atoms and from 0 to 10 oxygen atoms, connected to the Group 13 element by a carbon or oxygen bond.

Exemplary of the R group suitable for use herein is $C_{1-100}$ alkyl, $C_{1-100}$ alkoxy, $C_{2-100}$ alkenyl, $C_{4-100}$ dienyl, $C_{3-100}$ cycloalkyl, $C_{3-100}$ cycloalkoxy, $C_{3-100}$ cycloalkenyl, $C_{4-100}$ cyclodienyl, $C_{6-100}$ aryl, $C_{7-100}$ aralkyl, $C_{7-100}$ aralkoxy and $C_{7-100}$ alkaryl. Also exemplary of the R group are hydrocarbons containing from 1 to 100 carbon atoms and from 1 to 10 oxygen atoms.

Exemplary of the co-catalyst used in the process used to make some of the polyolefins of the present invention are where n=0 are trimethylaluminum; triethylborane; triethylgallane; triethylaluminum; tri-n-propylaluminum; tri-n-butylaluminum; tri-n-pentylaluminum; triisoprenylaluminum; tri-n-hexylaluminum; tri-n-heptylaluminum; tri-n-octylaluminum; triisopropylaluminum; triisobutylaluminum; tris(cylcohexylmethyl)aluminum; dimethylaluminum methoxide; dimethylaluminum ethoxide; diethylaluminum ethoxide and the like. Exemplary of compounds where n=1 are dimethylaluminum chloride; diethylaluminum chloride; di-n-propylaluminum chloride; di-n-butylaluminum chloride; di-n-pentylaluminum chloride; diisoprenylaluminum chloride; di-n-hexylaluminum chloride; di-n-heptylaluminum chloride; di-n-octylaluminum chloride; diisopropylaluminum chloride; diisobutylaluminum chloride; bis(cylcohexylmethyl)aluminum chloride; diethylaluminum fluoride; diethylaluminum bromide; diethylaluminum iodide; dimethylaluminum hydride; diethylaluminum hydride; di-n-propylaluminum hydride; di-n-butylaluminum hydride; di-n-pentylaluminum hydride; diisoprenylaluminum hydride; di-n-hexylaluminum hydride; di-n-heptylaluminum hydride; di-n-octylaluminum hydride; diisopropylaluminum hydride; diisobutylaluminum hydride; bis(cylcohexylmethyl)aluminum hydride; chloromethylaluminum methoxide; chloromethylaluminum ethoxide; chloroethylaluminum ethoxide and the like. Exemplary of compounds where n=2 are methylaluminum dichloride; ethylaluminum dichloride; n-propylaluminum dichloride; n-butylaluminum dichloride; n-pentylaluminum dichloride; isoprenylaluminum dichloride; n-hexylaluminum dichloride; n-heptylaluminum dichloride; n-octylaluminum dichloride; isopropylaluminum dichloride; isobutylaluminum dichloride; (cylcohexylmethyl)aluminum dichloride and the like. Also exemplary are alkylaluminum sesquialkoxides such as methylaluminum sesquimethoxide; ethylaluminum sesquiethoxide; n-butylaluminum sesqui-n-butoxide and the like. Also exemplary are alkylaluminum sesquihalides such as methylaluminum sesquichloride; ethylaluminum sesquichloride; isobutylaluminum sesquichloride; ethylaluminum sesquifluoride; ethylaluminum sesquibromide; ethylaluminum sesquiiodide and the like.

Preferred for use herein as co-catalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum, tri-n-decylaluminum; and dialkylaluminum halides such as dimethylaluminum chloride, diethylaluminum chloride, dibutylaluminum chloride, diisobutylaluminum chloride, diethylaluminum bromide and diethylaluminum iodide; and alkylaluminum sesquihalides such as methylaluminum sesquichloride, ethylaluminum sesquichloride, n-butylaluminum sesquichloride, isobutylaluminum sesquichloride, ethylaluminum sesquifluoride, ethylaluminum sesquibromide and ethylaluminum sesquiiodide.

Most preferred for use herein as co-catalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum and dialkylaluminum halides such as dimethylaluminum chloride, diethylaluminum chloride, dibutylaluminum chloride, diisobutylaluminum chloride and alkylaluminum sesquihalides such as methylaluminum sesquichloride, ethylaluminum sesquichloride, n-butylaluminum sesquichloride and isobutylaluminum sesquichloride.

Mixtures of compounds of the above formula $X_nER_{3-n}$ also can be utilized herein as the co-catalyst.

Any or all of the components of the Ziegler-Natta catalyst can be supported on a carrier. The carrier can be any particulate organic or inorganic material. Preferably the carrier particle size should not be larger than about 200 microns in diameter. The most preferred particle size of the carrier material can be easily established by experiment. Preferably, the carrier should have an average particle size of 5 to 200 microns in diameter, more preferably 10 to 150 microns and most preferably 20 to 100 microns.

Examples of suitable inorganic carriers include metal oxides, metal hydroxides, metal halogenides or other metal salts, such as sulphates, carbonates, phosphates, nitrates and silicates. Exemplary of inorganic carriers suitable for use herein are compounds of metals from Groups 1 and 2 of the of the Periodic Table of the Elements, such as salts of sodium or potassium and oxides or salts of magnesium or calcium, for instance the chlorides, sulphates, carbonates, phosphates or silicates of sodium, potassium, magnesium or calcium and the oxides or hydroxides of, for instance, magnesium or calcium. Also suitable for use are inorganic oxides such as silica, titania, alumina, zirconia, chromia, boron oxide, silanized silica, silica hydrogels, silica xerogels, silica aerogels, and mixed oxides such as talcs, silica/chromia, silica/chromia/titania, silica/alumina, silica/titania, silica/magnesia, silica/magnesia/titania, aluminum phosphate gels, silica co-gels and the like. The inorganic oxides may contain small amounts of carbonates, nitrates, sulfates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$. Carriers containing at least one component selected from the group consisting of $MgCl_2$, $SiO_2$, $Al_2O_3$ or mixtures thereof as a main component are preferred.

Examples of suitable organic carriers include polymers such as, for example, polyethylene, polypropylene, interpolymers of ethylene and alpha-olefins, polystyrene, functionalized polystyrene, polyamides and polyesters.

In the event that the Ziegler-Natta catalyst is to be used in prepolymer form, the co-catalyst used to form the prepolymer can be any organometallic compound comprising a metal of Groups 1, 2, 11, 12, 13 and 14 of the above described Periodic Table of the Elements. Exemplary of such metals are lithium, magnesium, copper, zinc, boron, silicon and the like. When a prepolymer is employed in the polymerization medium additional co-catalyst(s), if utilized, may be the same or different as that utilized in preparing the prepolymer. When utilized, external electron donor(s) and/or halogenated hydrocarbon(s) can be added to the prepolymer.

The Ziegler-Natta catalyst may contain conventional components in addition to the transition metal component and the co-catalyst. For example, there may be added any magnesium compound, halogenated hydrocarbon and the like. Furthermore there may be added to the Ziegler-Natta catalyst any electron donor. The electron donor compound preferably is selected from the group consisting of carboxylic acid esters, anhydrides, acid halides, ethers, thioethers, aldehydes, ketones, imines, amines, amides, nitriles, isonitriles, cyanates, isocyanates, thiocyanates, isothiocyanates, thioesters, dithioesters, carbonic esters, hydrocarbyl carbamates, hydrocarbyl thiocarbamates, hydrocarbyl dithiocarbamates, urethanes, sulfoxides, sulfones, sulfonamides, organosilicon compounds containing at least one oxygen atom, and nitrogen, phosphorus, arsenic or antimony compounds connected to an organic group through a carbon or oxygen atom. More preferred as electron donors are compounds containing from 1 to 50 carbon atoms and from 1 to 30 heteroatoms of an element, or mixtures thereof, selected from Groups 14, 15, 16 and 17 of the Periodic Table of Elements.

The Ziegler-Natta catalyst may be prepared by any method known in the art. The catalyst can be in the form of a solution, a slurry or a dry free flowing powder. The amount of Ziegler-Natta catalyst used is that which is sufficient to allow production of the desired amount of the polyolefin.

The polymerization reaction may be carried out in the presence of dinitrogen monoxide ($N_2O$). It is essential that the dinitrogen monoxide be utilized in an amount that will be sufficient to result in the production of polyolefins characterized by having a molecular weight distribution narrower than would be obtained in the absence of utilizing the dinitrogen monoxide in the specified amount. The molecular weight distribution of the polyolefins herein is evidenced by the melt flow ratio (MFR) values of the polyolefins.

Dinitrogen monoxide ($N_2O$) may be added to the polymerization medium in an amount from about 1 ppm to about 10,000 ppm by volume in order to produce polyolefins having narrowed molecular weight distributions.

Polyethylenes thus produced may be characterized by narrower molecular weight distribution and generally, a reduced n-hexane soluble polymeric fraction.

There may be added other conventional additives in processes for polymerizing olefins. Specifically there may be added any halogenated hydrocarbon, including those mentioned hereinbefore, and preferably, chloroform. Further, there may be added any external or internal electron donor, or mixtures of electron donors, such as those mentioned hereinbefore, and preferably, tetrahydrofuran.

Exemplary of the polymers of the present invention include the following:

A. Homopolymers of ethylene and interpolymers of ethylene and at least one or more alpha-olefins having 3 to 16 carbon atoms wherein ethylene comprises at least about 50% by weight of the total monomers involved;

B. Interpolymers of ethylene and 1-hexene wherein ethylene comprises at least about 50% by weight of the copolymer and have a differential scanning calorimetry (DSC) melt transition temperature, $T_m$, of about 116° C. to about 123° C., a density of about 0.880 g/cc to about 0.930 g/cc, a n-hexane extractable of from 0 to about 6 weight percent, and a melt flow ratio of about 26 to about 34;

C. Interpolymers of ethylene and 1-hexene having a DSC melt transition temperature, $T_m$, of about 119° C. to about 121° C., a density of about 0.905 g/cc to about 0.920 g/cc, a n-hexane extractable of from 0 to about 3 weight percent, and a melt flow ratio of about 26 to about 32;

D. Interpolymers of ethylene and an olefin having from 3 to 16 carbon atoms, wherein ethylene comprises at least 99% by weight of the copolymer, and the interpolymer has a melt flow ratio of from about 22 to about 26; and E. Interpolymers of ethylene and at least one or more olefin(s) having 5 to 16 carbon atoms, wherein ethylene comprises at least about 50% by weight of the interpolymer having a DSC melt transition temperature of about 116° C. to about 123° C., a density of from about 0.880 g/cc to about 0.930 g/cc, a n-hexane extractable of from 0 to about 6 weight percent, and a melt flow ratio of from about 26 to about 34.

Any conventional additive may be added to the polyolefins obtained by the present invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, antifoaming agents, flame retardants, crosslinking agents, flowability improvers such as peroxides, ultraviolet light absorbers, light stabilizers, weathering stabilizers, weld strength improvers, slip agents, anti-blocking agents, antifogging agents, dyes, pigments, natural oils, synthetic oils, waxes, fillers and rubber ingredients.

Another embodiment of the present invention is a polyolefin concentrate comprising:
(A) at least one polyolefin prepared in the presence of at least one Ziegler-Natta catalyst; and
(B) up to about 10 weight percent, preferably about 5 to 10 weight percent, based on the total weight of the polyolefin of at least one salt prepared by the reaction of one or more acidic phosphorus-containing compounds and one or more basic organic compounds which contain nitrogen; and optionally
(C) up to about 2.0 weight percent of one or more phenolic antioxidants, preferably up to about 0.5 weight percent and optionally up to about 3 weight percent of one or more ultraviolet light absorbing compounds, preferably up to about 1 weight percent.

The compositions of the present invention also may contain one or more compounds selected from the group consisting of (D) water, (E) colorants and pigments such as organic colorants, inorganic colorants and or white pigments such as $TiO_2$, ZnO and barium sulfate, (F) other additives such as impact modifiers, plasticizers, halogenated flame-retardants, fillers, optical brighteners, dyes, silicas, calcium carbonate, clays, talc, processing aids, impact modifiers, antioxidants, nonhalogenated flame-retardants, synergists, processing aids, phosphite stabilizers, phosphonite stabilizers and other stabilizers known to one skilled in the art; and (G) a recycled polymer. The most preferred pigment is titanium dioxide.

The preferred ultraviolet light absorbers of the invention are ones having the formulas of (21), (22), (24), and (25). The more preferred ultraviolet light absorbers of the invention are ones corresponding to formula (21). More particularly, ultraviolet light absorbers having formula (21) preferably have the formula wherein $R_{17}=R_{18}=R_{20}=R_{21}$=hydrogen, $R_{19}$=—$OC_8H_{17}$.

The terms "phenolic antioxidants" and "hindered phenol" are primary antioxidants that are known to those skilled in the art and may be represented by the structures listed on pages 98-108 in the *Plastic Additives Handbook 5th Edition* (Hanser Gardner Publications, Inc., Cincinnati, Ohio, USA, 2001), incorporated herein by reference in its entirety. Some common phenolic antioxidants are as follows: Irganox 1010 (Ciba Specialty Chemicals, CAS# 6683-19-8), Irganox 1076 (Ciba Specialty Chemicals, CAS#2082-79-3), Irganox 1330 (Ciba Specialty Chemicals, CAS# 1709-70-2) and Irganox 3114 (Ciba Specialty Chemicals, CAS# 27676-62-6. The preferred phenolic antioxidants are ones corresponding to formulas (32) and (30). More particularly, phenolic antioxidants having formula (32) preferably have the formula wherein N3=4, $R_{22}=R_{34}$=—$C(CH_3)_3$ and $Y_1$=—(O)CO— and phenolic antioxidants having formula (30) preferably have the formula wherein $R_{22}=R_{33}$=tert-butyl, $Y_1$=—(O)CO—, n2=1 and $R_{43}=C_{18}H_{37}$.

The terms "phosphite and phosphonite stabilizers" includes but is not limited to compounds sold under the following tradenames: Irgafos TNPP (Ciba Specialty Chemicals, CAS# 26523-78-4), Irgafos 168 (Ciba Specialty Chemicals, CAS# 31570-04-4), Ultranox 626 (GE Specialty Chemicals, CAS# 26741-53-7), Mark PEP 36 (Asahi Denka Co., Ltd., CAS#80693-00-1), Mark HP-10 (Asahi Denka Co., Ltd., CAS# 140221-14-3), Irgafos P-EPQ (Ciba Specialty Chemicals, CAS# 38613-77-3), Sandostab P-EPQ (Clariant Corp., CAS# 119345-01-6), Ethanox 398 (Albemarle Corp., CAS# 118337-09-0), Weston 618 (GE Specialty Chemicals, CAS# 3806-34-6), Irgafos 12 (Ciba Specialty Chemicals, CAS# 80410-33-9), Irgafos 38 (Ciba Specialty Chemicals, CAS# 145650-60-8), Ultranox 641 (GE Specialty Chemicals, CAS# 161717-32-4), Doverphos S-9228 (Dover Chemical Corp. CAS# 154862-43-8) and the like. More preferred are bis(2,4-di-tert-butylphenyl)pentaerythritol diphosphite (Ultranox 626 available from GE Specialty Chemicals), distearyl pentaerythritol diphosphite (Weston 619 available from GE Specialty Chemicals), and bis(2,4-dicumylphenyl)pentaerythritol diphosphite (Doverphos 9228 available from Dover Chemical Corporation). The most preferred is distearyl pentaerythritol diphosphite (Weston 619 available from GE Specialty Chemicals).

The term "halogenated flame-retardants" is defined as compounds that can contain one or more of the following: fluorine, chlorine, bromine, and iodine, which act in such a way as to decrease the flammability of the polyolefin composition. More preferred are compounds that contain bromine such as brominated polycarbonate, brominated polystyrene, and the like.

The salts of the phosphorus-containing acids and suitable basic organic compounds are believed to substantially deactivate the metallic catalyst residues present in polyolefin component (A) so that the residues lose their ability to form colored complexes with phenolic antioxidants, UV absorbers and other phenolic species. Salts of phosphorus-containing acids and basic organic compounds, as defined herein, may reduce the amount of corrosion to process equipment as compared to some of the hydrolysis products of commercial phosphites, phosphorous acid, phosphoric acid, and polyphosphoric acid, thereby improving the color of the polyolefin composition and reducing corrosion of the process equipment.

The compositions provided by the present invention are useful for improving the properties of heavy-gauge sheet, cap layers for extruded sheet, cap layers for extruded films, thermoformable sheeting products, injection molded products, thin films, thick films, articles made using thin films, articles made using thick films.

Sulfuric acid and sulfurous acid also will make salts with the nitrogen-containing compounds disclosed herein that are effective at improving the color of polyolefin compositions that contain UV absorbers and/or phenolic antioxidants. Typically, the improvement in color is not as dramatic as that observed for the salts made using phosphorus-containing acids such as phosphoric acid or phosphorous acid according to the present invention.

EXAMPLES

This invention is further illustrated by the following examples of preferred embodiments thereof, although it will be understood that these examples are included merely for purposes of illustration and are not intended to limit the scope of the invention unless otherwise specifically indicated. Unless otherwise indicated, all weight percentages are based on the total weight of the polymer composition and all molecular weights are weight average molecular weights.

Also, all percentages are by weight unless otherwise indicated. Wherever an R group, L group, Y group, Z group, m group or n group is defined herein, the definition for a particular group remains the same throughout this description regardless of whether it is used for multiple formulas or types of compounds unless otherwise specified.

Example 1

Preparation of a Concentrate of Titanium Dioxide and Low-Density Polyethylene

A mixture of 900 g of low-density polyethylene (Eastman Chemical Company Tenite 1924P) and 100 g titanium dioxide (J. T. Baker Reagent Anatase) was compounded at 200 C on an APV 18-mm twin-screw extruder (APV Chemical Machinery Inc., Saginaw, Mich.), extruded into a rod and chopped into pellets.

Example 2

Preparation of a Polyolefin Composition Containing a HALS Salt (Example 6)

A mixture of 999 g of LDPE (Eastman Chemical Company Tenite 1924P) and 1 g of the phosphorous acid Salt of the HALS Cyasorb 3529 (Cytec Corporation) was melt-compounded as in Example 1, and was then compression molded into 5-mil (125 micrometer) film.

Example 3

Preparation of a Polyolefin Composition Containing a HALS Salt (Example 6) and Titanium Dioxide A mixture of 900 g of low-density polyethylene (Eastman Chemical Company 1924P) and 100 g of the concentrate of Example 1 was melt-compounded as in Example 1, and was then compression molded into 5-mil film.

Example 4

Preparation of a Polyolefin Composition Containing a HALS Salt (Example 6), Titanium Dioxide and an Antioxidant A mixture of 899 g of low-density polyethylene (Eastman Chemical Company 1924P), 100 g of the concentrate of Example 1, and 0.1 g of 4,4'-thio-bis(2-tert-butyl-5-methylphenol) (Lowinox TBM6 antioxidant, Great Lakes Chemical Corp., CAS# 96-69-5) was melt-compounded as in Example 1, and was then compression molded into 5-mil film.

Additional Examples using similar procedures as those described in previous Examples are shown in Tables 1, 2 and 3. Color measurements on the films (Commission International d'Eclairage L*a*b* values) were made in a Spectroflash 600 unit using D65 illuminant and 10 degree observer). An increase in the positive b* value indicates increasing yellowness, while a decrease in the numerical value of the b* indicates a reduction in yellowness. To reproduce the results on any colorimeter, run the instrument according to its instructions and use the following testing parameters: D65 Light Source (daylight, 6500° K color temperature), Reflectance Mode, Large Area View, Specular Included, CIE 10° Observer, Outputs are CIE L*, a*, b*. Color measurement and practice are discussed in greater detail in Anni Berger-Schunn in *Practical Color Measurement*, Wiley, N.Y. pages 39-56 and 91-98 (1994). Preferably, the b* value is less than +4, more preferably less than about +2.

Example 6

Preparation of Salt

To a clean, dry, 5-L, round-bottomed flask equipped with a mechanical stir bar, thermocouple, and a heating mantle was added 411.76 g of Cyasorb UV-3529 and 945 g of toluene. Cyasorb UV-3529 is a polymeric hindered amine light stabilizer believed to conform generally to the compounds of amine formula (12) set forth above $R_6=R_7=R_8=R_9=R_{10}$=methyl; $L_1$ is hexamethylene; and $(R_3)(R_4)N$— collectively represent a morpholino group. The slurry was heated to 60° C. and stirred until a homogeneous solution was obtained. Isopropyl alcohol (370 g) was added to the reaction vessel. A solution of 115.46 g (1.41 mol) of phosphorous acid dissolved into 370 g of isopropyl alcohol was added slowly over approximately 1 hour. A homogeneous solution was obtained. The reaction mixture was pumped into an 18 L reaction vessel that contained rapidly stirred heptane (6840 g) over a period of approximately 1 hour. The resulting slurry was stirred for 30 minutes. The precipitate was collected by suction filtration. The filter cake was washed twice with 137 g of heptane then sucked dry on the filter paper overnight. The solid was placed in a 30.5 cm×15.2×5.1 (12 inch×6 inch×2 inch) metal pan and dried in a vacuum oven at 50-60° C. with a slight ingress of dry nitrogen until a constant mass was obtained. The dry product (Salt 1) weighed approximately 525 g (100% of theory).

Table 1 shows the effect of the HALS salt of Example 6 on the color (b*) of polyolefins with no addition of antioxidant.

TABLE 1

| | Effect of Example 6 on b* Color of Polyolefins | | |
|---|---|---|---|
| Polymer | b* color No Salt | b* color 0.1% Salt | Improvement With Salt |
| LDPE | −1.2 | −1.2 | None |
| LLDPE | 1.65 | 0.72 | 0.93 |
| HDPE | 1.67 | 1.66 | None |
| PP | −0.01 | −0.09 | None |

Salt is Example 6
LDPE is Tenite 1924P Low-Density Polyethylene (Eastman Chemical Company)
LLDPE is Linear Low Density Polyethylene
HDPE is XH4620 High Density Polyethylene (Equistar Chemical Company)
PP is P463Z-039 Polypropylene (Huntsman Corporation)

Table 2 shows the effect of the HALS salt of Example 6 on the color (b*) of polyolefins containing a low concentration of a phenolic antioxidant.

TABLE 2

| | Effects of Example 6 on b* Color of Polyolefins Containing Phenols | | |
|---|---|---|---|
| Polymer | b* color No Salt | b* color 0.1% Salt | Improvement With Example 6 |
| LDPE + 0.1% Antioxidant | −1.04 | −1.22 | 0.18 |
| LLDPE + 0.1% Antioxidant | 1.93 | 1.46 | 0.47 |

TABLE 2-continued

Effects of Example 6 on b* Color of Polyolefins Containing Phenols

| Polymer | b* color No Salt | b* color 0.1% Salt | Improvement With Example 6 |
|---|---|---|---|
| HDPE + 0.1% Antioxidant | 2.10 | 1.99 | 0.11 |
| PP + 0.1% Antioxidant | 0.20 | 0.14 | 0.06 |

Phenolic antioxidant is Lowinox TBM6 (Great Lakes Chemical Corporation).

Table 3 shows the effect of the HALS salt of Example 6 on the color (b*) of a titanium dioxide pigmented polyolefin containing a phenolic antioxidant.

TABLE 3

Effect of Example 6 on b* Color of Polyolefins Containing Titanium Dioxide

| Polymer | b* color | Improvement with Example 6 |
|---|---|---|
| LDPE + 0.1 wt % Lowinox TBM6 + 1 wt % TiO$_2$ | 3.32 | |
| LDPE + 0.1 wt % Lowinox TBM6 + 1 wt % TiO$_2$ + 0.1 wt % Examples | 2.7 | 0.62 |

It can be seen from these data that salts of basic organic compounds that contain nitrogen improve the color of polyolefins which contain phenolic compounds.

The invention has been described in detail with particular reference to preferred embodiments thereof, but it will be understood that variations and modifications can be effected within the spirit and scope of the invention.

We claim:
1. A polyolefin composition comprising:
(A) at least one polyolefin prepared in the presence of at least one Ziegler-Natta catalyst;
(B) at least one salt in an amount effective to improve the color of the polyolefin composition ranging from 0.05 to 1.8 weight percent based on the total weight of the composition, said salt being prepared by the reaction of one or more acidic phosphorus-containing compounds with one or more basic organic compounds which contain nitrogen; and
(C) at least one phenolic antioxidant,
wherein the basic organic compounds are selected from compounds having one of the formulas:

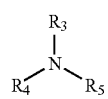
(1)

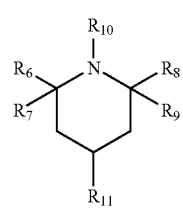
(2)

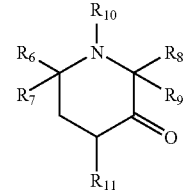
(3)

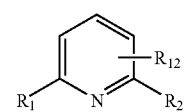
(4)

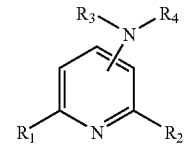
(5)

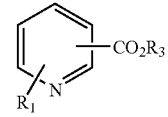
(6)

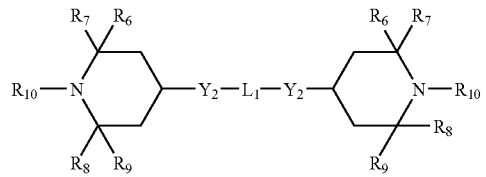
(7)

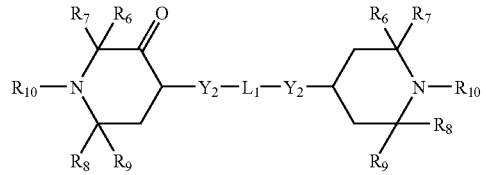
(8)

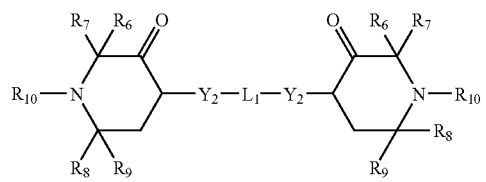
(9)

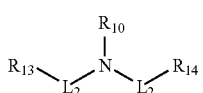
(10)

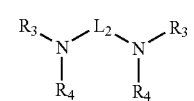
(11)

-continued
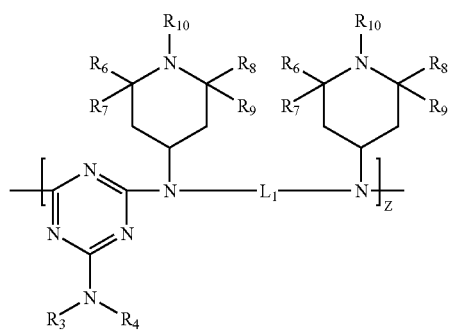 (12)
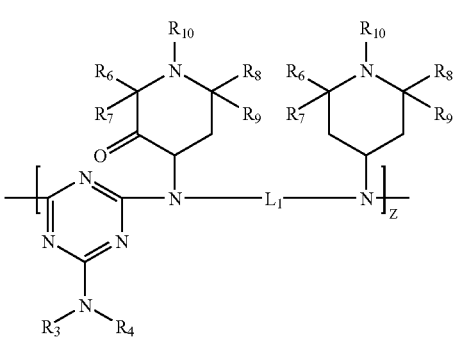 (13)
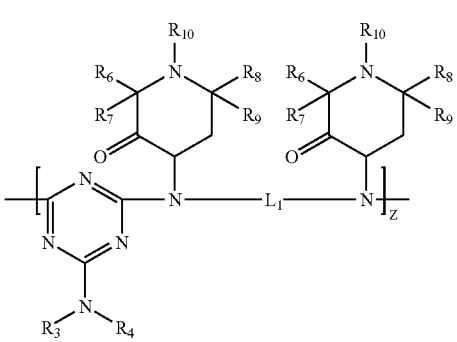 (14)
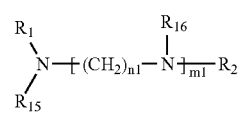 (15)
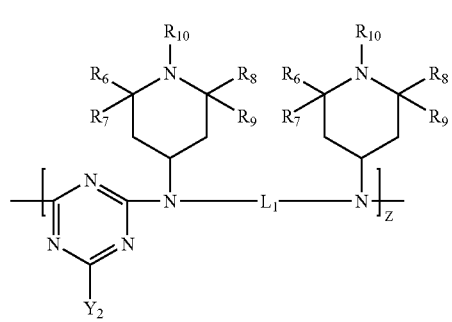 (16)
-continued
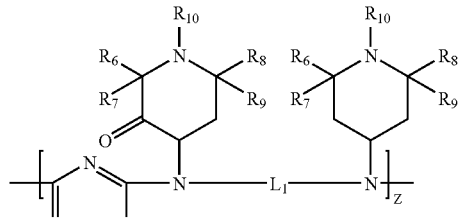 (17)
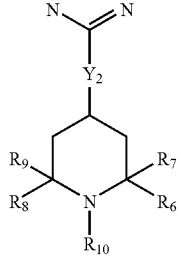
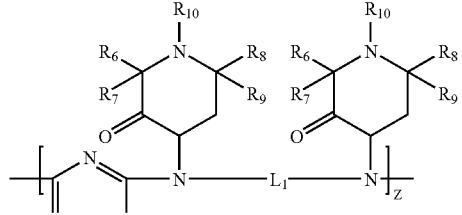 (18)
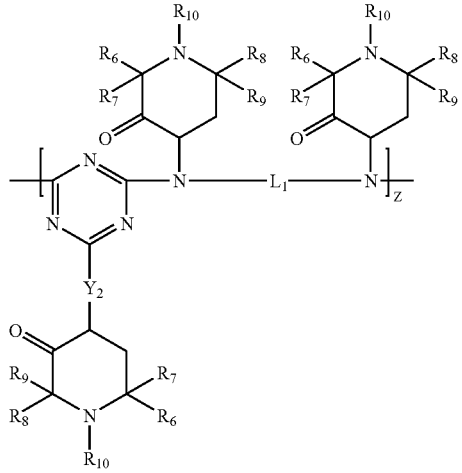 (19)
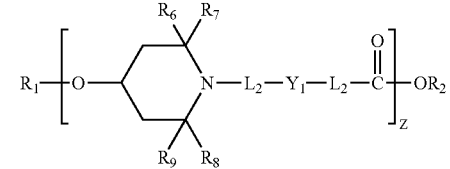 (20)

wherein

R$_1$ and R$_2$ are independently selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_3$, R$_4$, and R$_5$ are independently selected from hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl wherein at least one of R$_3$, R$_4$, and R$_5$ is a substituent other than hydrogen; R$_3$ and R$_4$ or R$_4$ and R$_5$ may collectively represent a divalent group forming a ring with the nitrogen atom to which they are attached;

R$_6$, R$_7$, R$_8$, and R$_9$ are independently selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_{10}$ is selected from hydrogen, —OR$_6$, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{11}$ is selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, aryl, and a succinimido group having the formula

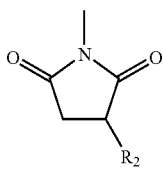

R$_{12}$ is selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, aryl and may be located at the 2, 3 or 4 positions on the aromatic ring of formula (4);

the —N(R$_3$)(R$_4$) group may be located at the 2, 3 or 4 positions on the pyridine ring of formula (5);

the —CO$_2$R$_3$ and R$_1$ groups may be located at any of the 2, 3, 4, 5, 6 positions of the pyridine ring of nitrogen of formula (6);

L$_1$ is a divalent linking group selected from C$_2$-C$_{22}$-alkylene, —(CH$_2$CH$_2$—Y$_1$)$_{1-3}$—CH$_2$CH$_2$—, C$_3$-C$_8$-cycloalkylene, arylene, or and —CO-L$_2$-OC—;

L$_2$ is selected from C$_1$-C$_{22}$-alkylene, arylene, —(CH$_2$CH$_2$—Y$_1$)$_{1-3}$—CH$_2$CH$_2$— and C$_3$-C$_8$-cycloalkylene;

Y$_1$ is selected from —OC(O)—, —NHC(O)—, —O—, —S—, and —N(R$_1$)—;

Y$_2$ is selected from —O— and —N(R$_1$)—;

R$_{13}$ and R$_{14}$ are independently selected from —O—R$_2$, and —N(R$_2$)$_2$;

Z is a positive integer of up to about 20;

m1, is selected from 0 to about 10;

n1 is a positive integer selected from 2 to about 12; and

R$_{15}$, and R$_{16}$ are independently selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, aryl, and radical A wherein radical A is selected from the following structures:

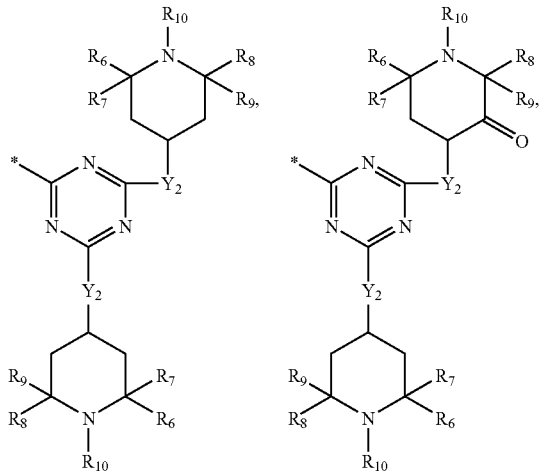

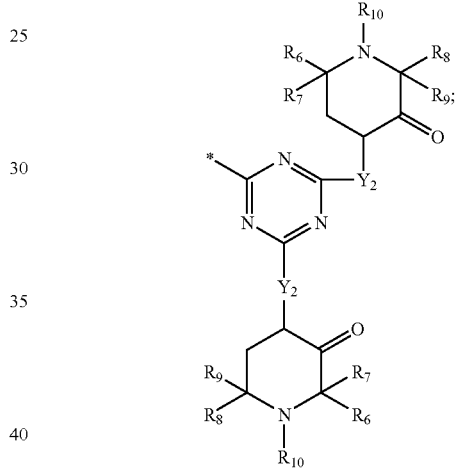

Radical A structures wherein * designates the position of attachment.

2. A polyolefin composition according to claim 1 wherein the acidic phosphorus-containing compounds are selected from compounds having one of the formulas:

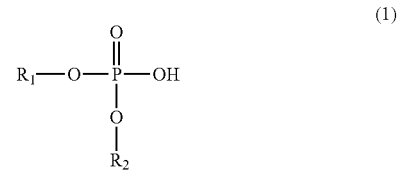

(1)

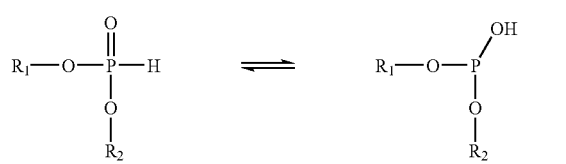

(2)

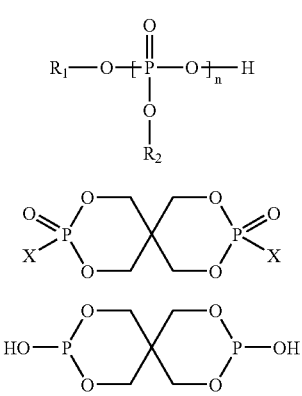
(3)
(4)
(5)
wherein
R$_1$ and R$_2$ are independently selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;
n is 2 to 500;
X is selected from hydrogen and hydroxy; and
wherein the basic organic compounds are selected from compounds having one of the formulas:
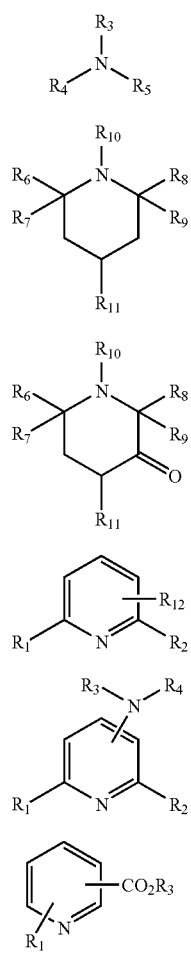
(1)
(2)
(3)
(4)
(5)
(6)
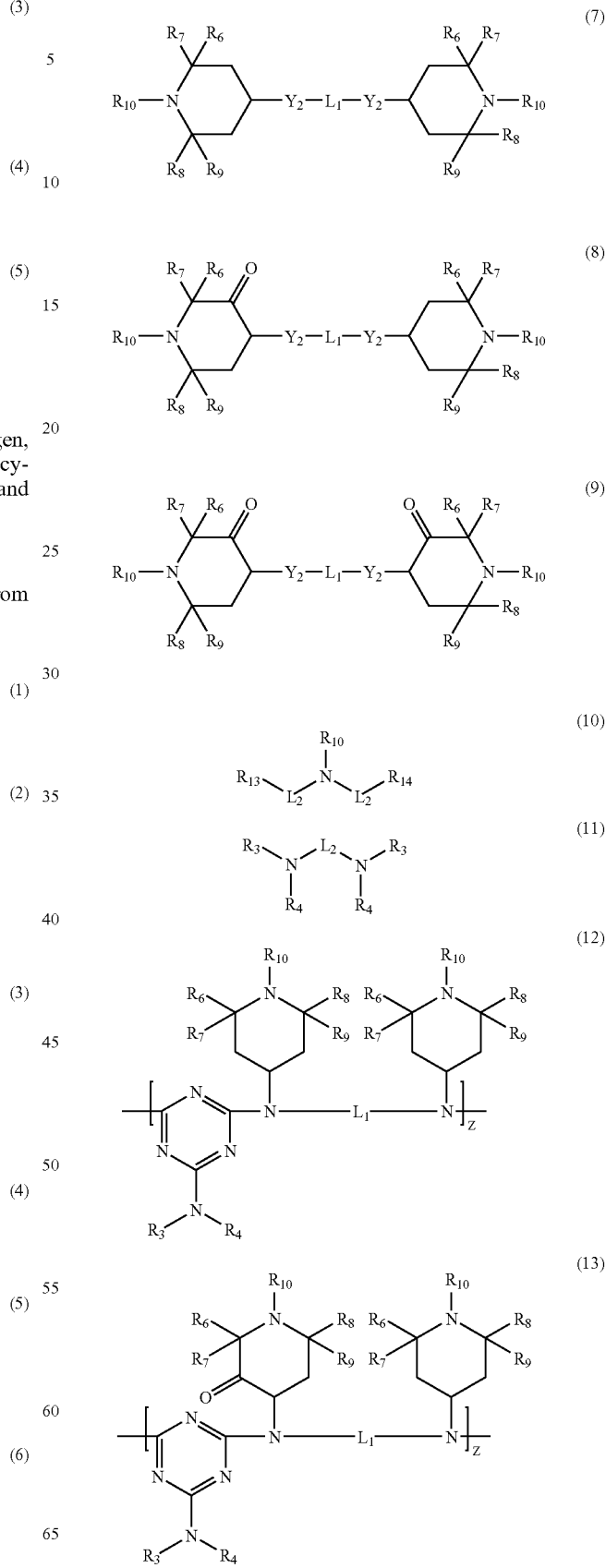
(7)
(8)
(9)
(10)
(11)
(12)
(13)

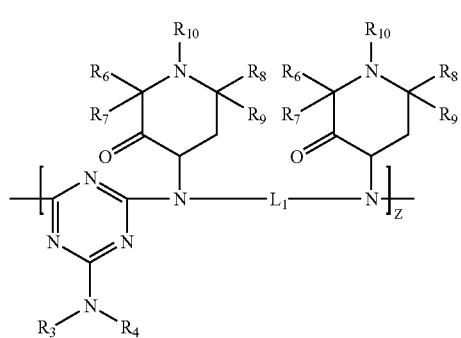

wherein
R$_1$ and R$_2$ are independently selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_3$, R$_4$, and R$_5$ are independently selected from hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl wherein at least one of R$_3$, R$_4$, and R$_5$ is a substituent other than hydrogen; R$_3$ and R$_4$ or R$_4$ and R$_5$ may collectively represent a divalent group forming a ring with the nitrogen atom to which they are attached;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;

$R_{11}$ is selected from hydrogen; $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and a succinimido group having the formula

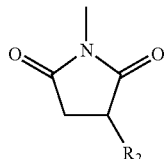

$R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 2, 3 or 4 positions on the aromatic ring of formula (4);

the —$N(R_3)(R_4)$ group may be located at the 2, 3 or 4 positions on the pyridine ring of formula (5);

the —$CO_2R_3$ and $R_1$ groups may be located at any of the 2, 3, 4, 5, 6 positions of the pyridine ring of nitrogen of formula (6);

$L_1$ is a divalent linking group selected from $C_2$-$C_{22}$-alkylene, —$(CH_2CH_2—Y_1)_{1-3}$—$CH_2CH_2$—, $C_3$-$C_8$-cycloalkylene, arylene, and —CO-$L_2$-OC—;

$L_2$ is selected from $C_1$-$C_{22}$-alkylene, arylene, —$(CH_2CH_2—Y_1)_{1-3}$—$CH_2CH_2$— and $C_3$-$C_8$-cycloalkylene;

$Y_1$ is selected from —OC(O)—, —NHC(O)—, —O—, —S—, and —$N(R_1)$—;

$Y_2$ is selected from —O— and —$N(R_1)$—;

$R_{13}$ and $R_{14}$ are independently selected from —O—$R_2$, and —$N(R_2)_2$;

Z is a positive integer of up to about 20;

m1, is selected from 0 to about 10;

n1 is a positive integer selected from 2 to about 12; and $R_{15}$, and $R_{16}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

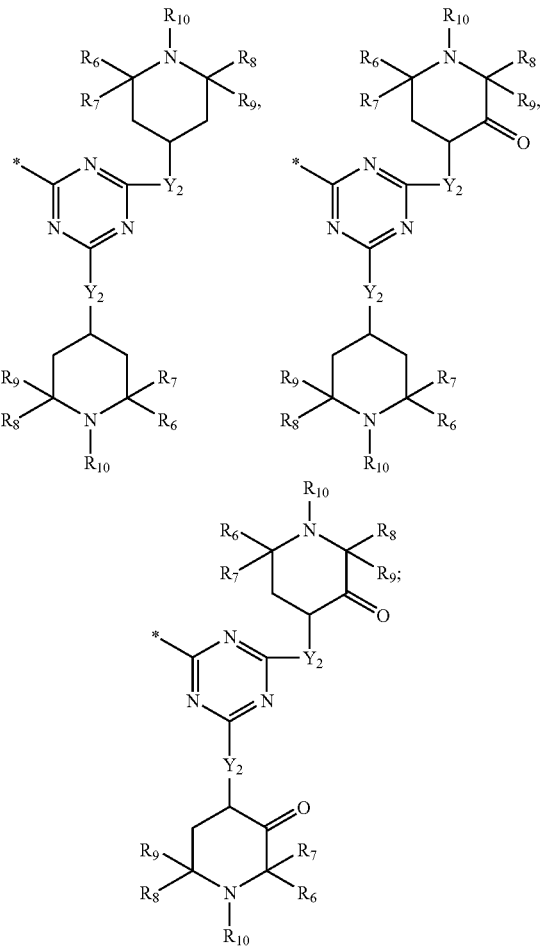

Radical A structures wherein * designates the position of attachment wherein the ratio of the number of phosphorus atoms in the acidic phosphorus-containing compound to the number of basic nitrogen atoms in the basic organic compound is about 0.05 to about 2; and wherein the phenolic antioxidant is selected from compounds having one of the formulas:

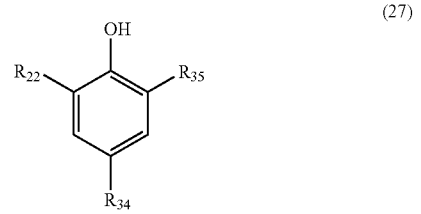

(27)

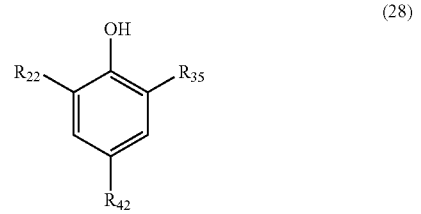

(28)

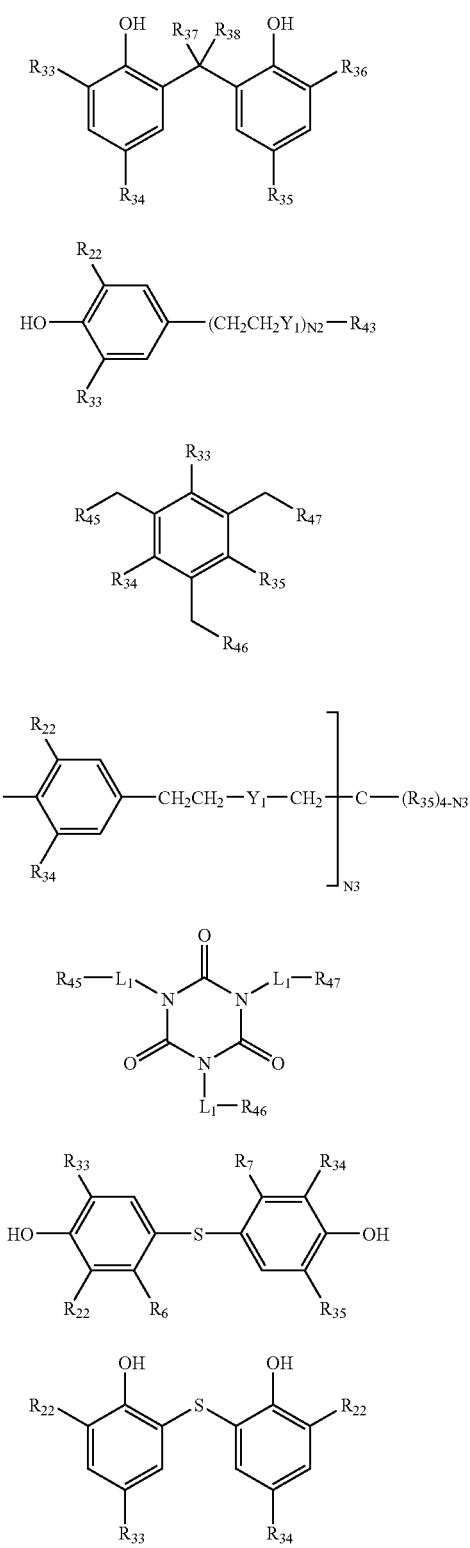

wherein
R₁ is independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_6$ and $R_7$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_{22}$ is selected from $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{29}$ is selected from hydrogen, hydroxy and —$CO_2R_{30}$;

$R_{30}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, aryl, and heteroaryl;

$R_{33}$, $R_{34}$, $R_{35}$, $R_{36}$, $R_{37}$, and $R_{38}$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{42}$ is —(CH₂CH₂—$Y_1$)$_{N2}$—$R_{29}$;

$R_{43}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$;

$R_{44}$ is a group having one of the formulas $R_{45}$, $R_{46}$ and $R_{47}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$ and at least one of $R_{45}$, $R_{46}$ and $R_{47}$ is —$R_{44}$;

$Y_1$ is selected from —OC(O)—, —NHC(O)—, —O—, —S—, and —N($R_1$)—;

$L_1$ is a divalent linking group selected from $C_2$-$C_{22}$-alkylene, —(CH₂CH₂—$Y_1$)$_{1-3}$—CH₂CH₂—, $C_3$-$C_8$-cycloalkylene, arylene, and —CO-$L_2$-OC—;

$L_2$ is selected from $C_1$-$C_{22}$-alkylene, arylene, —(CH₂CH₂—$Y_1$)$_{1-3}$—CH₂CH₂— and $C_3$-$C_8$-cycloalkylene;

N2 is a positive integer selected from 1 to about 20; and
N3 is a positive integer from 1 to 4.

3. A polyolefin composition according to claim 2 wherein the polyolefin of component (A) is selected from the group consisting of polyethylene, polypropylene, and polybutylene.

4. A polyolefin composition according to claim 3 wherein the polyolefin of component (A) comprises polyethylene.

5. A polyolefin composition according to claim 4 wherein the polyethylene is a low density polyethylene.

6. A polyolefin composition according to claim 4 wherein said polyethylene has a density in the range of from about 0.9 grams/cc to about 0.98 grams/cc.

7. A polyolefin composition according to claim 6 wherein said polyethylene has a density in the range of from about 0.910 grams/cc to about 0.965 grams/cc.

8. A polyolefin composition comprising:
(A) at least one polyolefin containing from about 0.05 to about 200 ppmw Fe, Ti, Co and/or Mn residues;
(B) about 0.05 to about 1.5 weight percent based on the total weight of the composition of at least one salt prepared by the reaction of one or more phosphorus-containing compounds selected from phosphorous acid, phosphoric acid and polyphosphoric acid with one or more basic organic compounds which contain nitrogen and have one of the formulas:
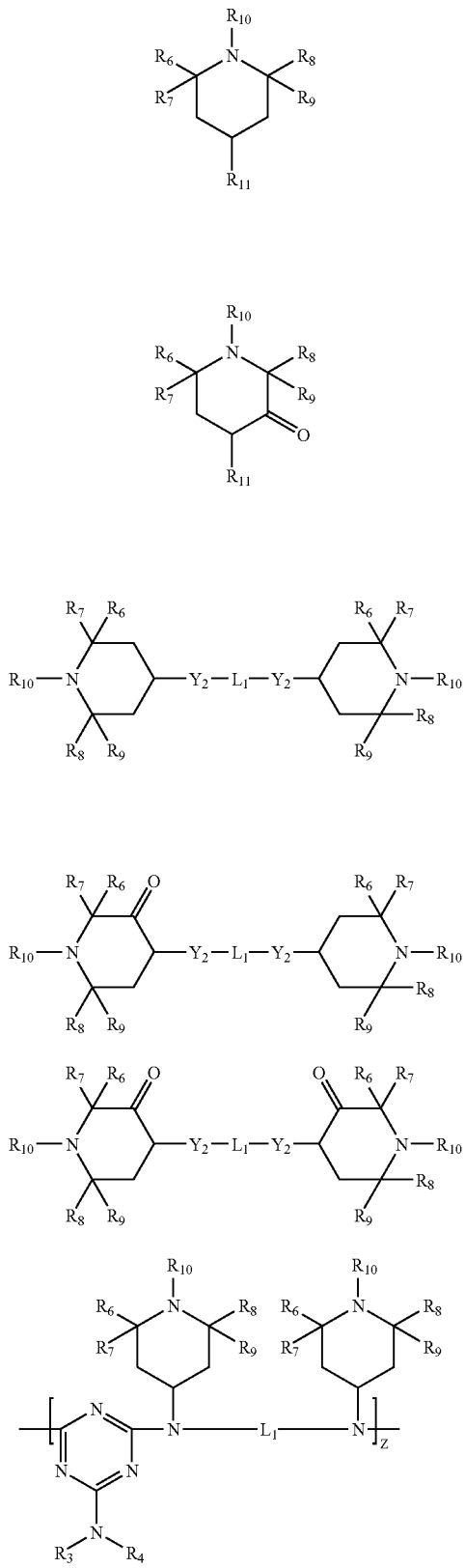
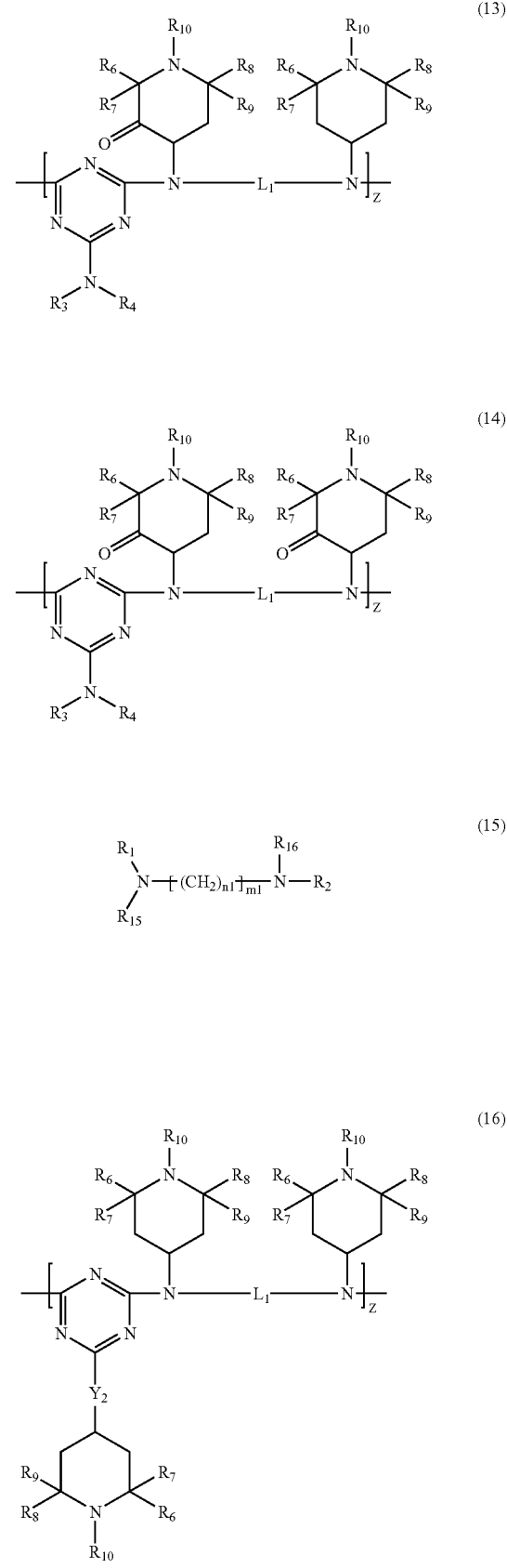

-continued (17)

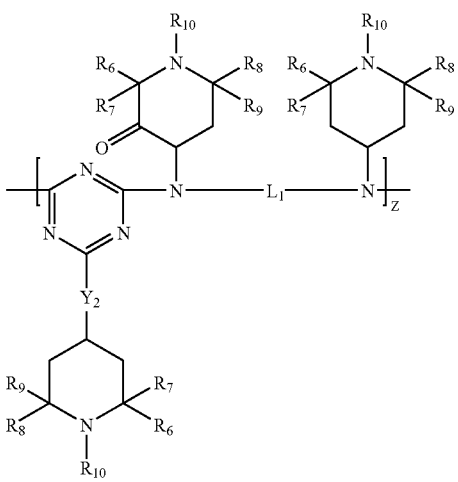

(18)

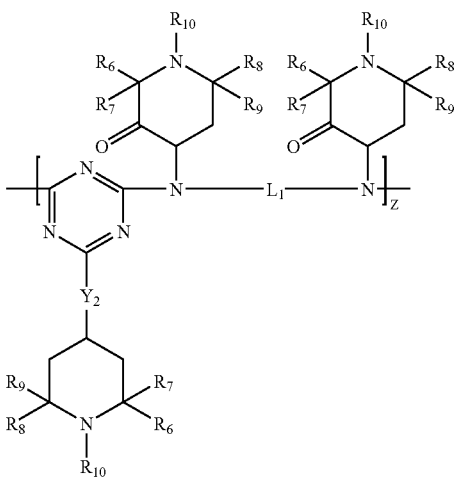

(19)

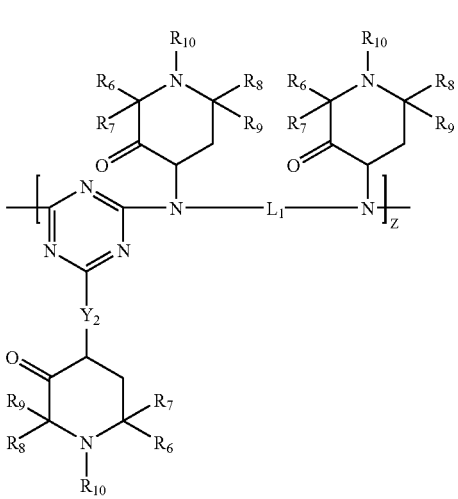

-continued (20)

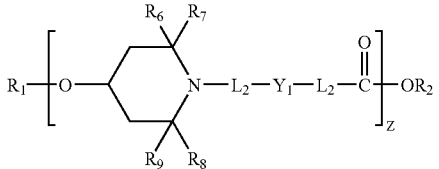

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_3$ and $R_4$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ and $R_4$ is a substituent other than hydrogen; $R_3$ and $R_4$ may collectively represent a divalent group forming a ring with the nitrogen atom to which they are attached;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;

$R_{11}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and a succinimido group having the formula

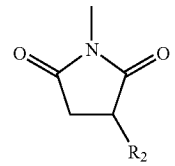

$L_1$ is a divalent linking group selected from $C_2$-$C_{22}$-alkylene, —$(CH_2CH_2$—$Y_1)_{1-3}$—$CH_2CH_2$—, $C_3$-$C_8$-cycloalkylene, arylene, and —CO-$L_2$-OC—;

$L_2$ is selected from $C_1$-$C_{22}$-alkylene, arylene, —$(CH_2CH_2$—$Y_1)_{1-3}$—$CH_2CH_2$— and $C_3$-$C_8$-cycloalkylene;

$Y_1$ is selected from —OC(O)—, —NHC(O)—, —O—, —S—, and —N($R_1$)—;

$Y_2$ is selected from —O— or —N($R_1$)—;

Z is a positive integer of up to about 20;

m1, is selected from 0 to about 10;

n1 is a positive integer selected from 2 to about 12;

$R_{15}$, and $R_{16}$ are independently selected from hydrogen, $C_1$-$C_{22}$-alkyl, substituted $C_1$-$C_{22}$-alkyl, $C_3$-$C_8$- cycloalkyl, substituted $C_3$-$C_8$-cycloalkyl, heteroaryl, aryl, and radical A wherein radical A is selected from the following structures:

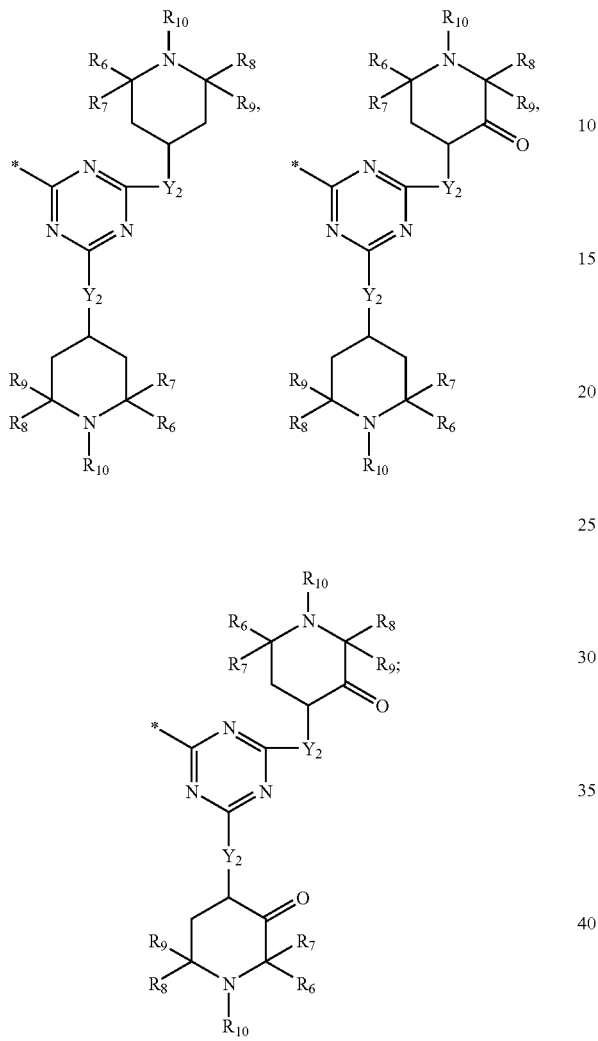

Radical A structures wherein * designates the position of attachment wherein at least one of $R_{15}$ or $R_{16}$ is an A radical; and wherein the ratio of the number of phosphorus atoms in the acidic phosphorus-containing compound to the number of basic nitrogen atoms in the basic organic compound is about 0.05 to about 2; and (C) wherein the phenol-containing compounds are selected from compounds having one of the formulas:

(27)

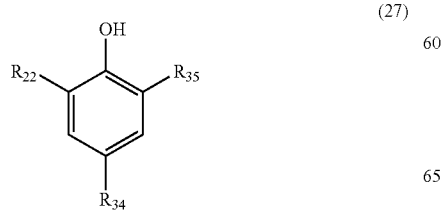

(28)

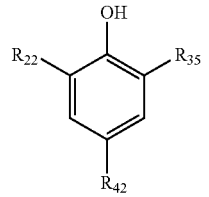

(29)

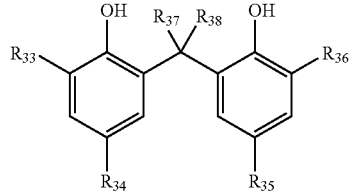

(30)

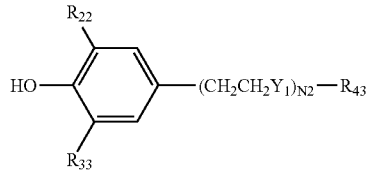

(31)

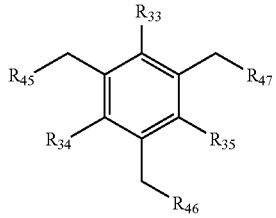

(32)

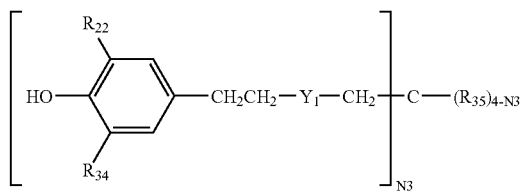

(33)

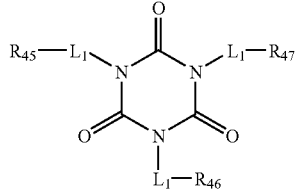

(34)

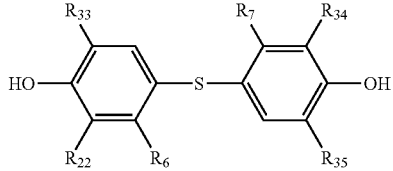

-continued

(35)
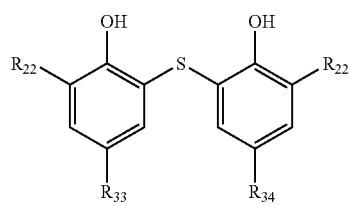

wherein
$R_1$ is independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
$R_6$ and $R_7$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;
$R_{22}$ is selected from $C_1$-$C_{22}$-alkyl, substituted $C_1$-$C_{22}$-alkyl, $C_3$-$C_8$-cycloalkyl, and substituted $C_3$-$C_8$-cycloalkyl;
$R_{29}$ is selected from hydrogen, hydroxy and —$CO_2R_{30}$;
$R_{30}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, aryl, and heteroaryl;
$R_{33}$, $R_{34}$, $R_{35}$, $R_{36}$, $R_{37}$, and $R_{38}$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;
$R_{42}$ is —$(CH_2CH_2—Y1)_{N2}$—$R_{29}$;
$R_{43}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$;
$R_{44}$ is a group having the formulas

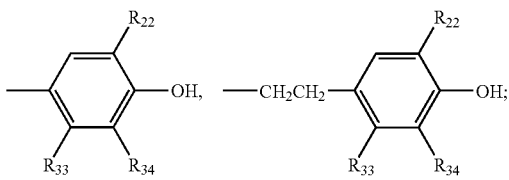

$R_{45}$, $R_{46}$ and $R_{47}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$ and at least one of $R_{45}$, $R_{46}$ and $R_{47}$ is —$R_{44}$;
$L_1$ is a divalent linking group selected from $C_2$-$C_{22}$-alkylene, —$(CH_2CH_2—Y_1)_{1-3}$—$CH_2CH_2$—, $C_3$-$C_8$-cycloalkylene, arylene, and —$CO$-$L_2$-$OC$—;
$L_2$ is selected from $C_1$-$C_{22}$-alkylene, arylene, —$(CH_2CH_2—Y_1)_{1-3}$—$CH_2CH_2$— and $C_3$-$C_8$-cycloalkylene;

$Y_1$ is selected from —$OC(O)$—, —$NHC(O)$—, —$O$—, —$S$—, and —$N(R_1)$—;
N2 is a positive integer selected from 1 to about 20; and
N3 is a positive integer from 1 to 4.

9. A composition according to claim 8 wherein $R_{10}$ is hydrogen or alkyl and the ratio of the number of phosphorus atoms in the acidic phosphorus-containing compound to the number of basic nitrogen atoms in the basic organic compound is about 0.25 to about 1.1.

10. A polyolefin composition comprising:
(A) at least one polyolefin;
(B) about 0.05 to about 1.5 weight percent based on the total weight of the composition of at least one salt prepared by the reaction of phosphorous acid with one or more basic organic compounds which contain nitrogen and have one of the formulas:

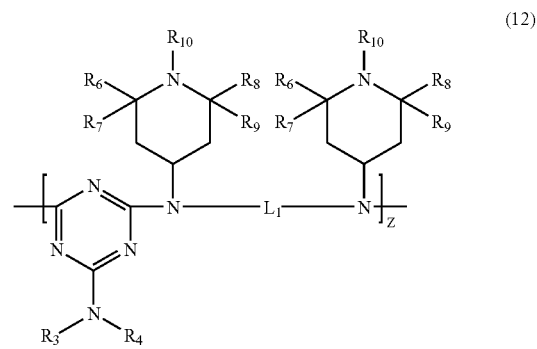
(12)

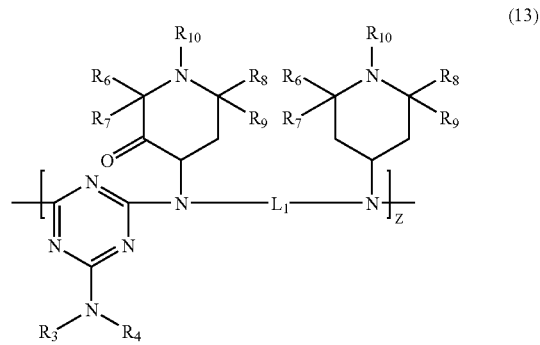
(13)

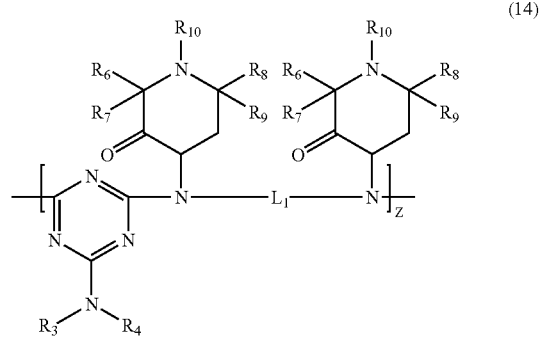
(14)

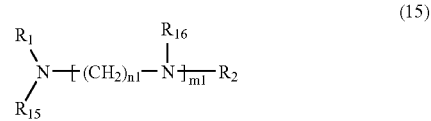
(15)

-continued

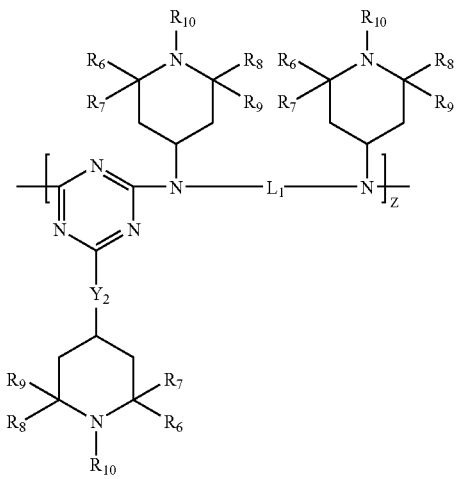
(16)

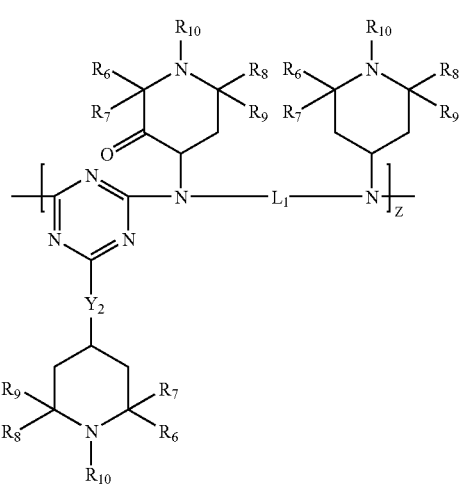
(17)

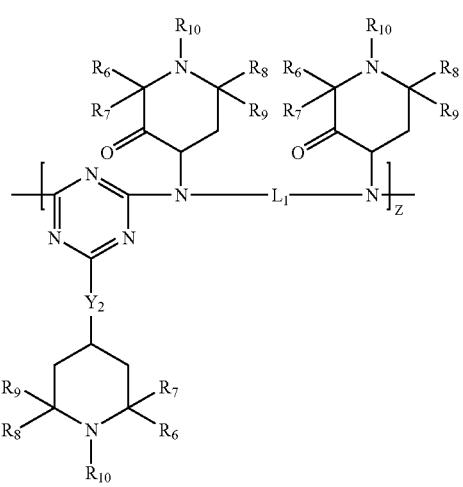
(18)

-continued

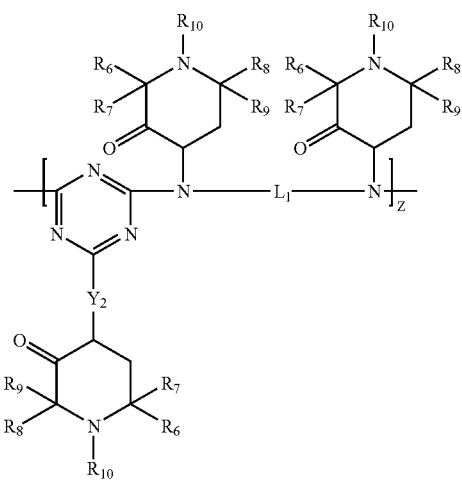
(19)

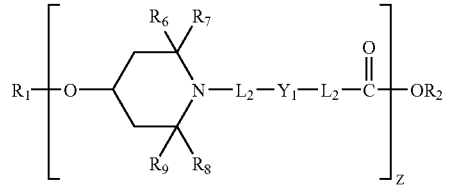
(20)

wherein
$R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_3$ and $R_4$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ and $R_4$ is a substituent other than hydrogen; $R_3$ and $R_4$ may collectively represent a divalent group forming a ring with the nitrogen atom to which they are attached;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_{10}$ is selected from hydrogen and $C_1$-$C_{22}$-alkyl;

$L_1$ is a divalent linking group selected from $C_2$-$C_{22}$-alkylene, —(CH$_2$CH$_2$—Y$_1$)$_{1-3}$—CH$_2$CH$_2$—, $C_3$-$C_8$-cycloalkylene, arylene, and —CO-L$_2$-OC—;

$L_2$ is selected from $C_1$-$C_{22}$-alkylene, arylene, —(CH$_2$CH$_2$—Y$_1$)$_{1-3}$—CH$_2$CH$_2$— and $C_3$-$C_8$-cycloalkylene;

$Y_1$ is selected from —OC(O)—, —NHC(O)—, —O—, —S—, and —N(R$_1$)—;

$Y_2$ is selected from —O— and —N(R$_1$)—;

Z is a positive integer of up to about 20;

m1, is selected from 0 to about 10;

n1 is a positive integer selected from 2 to about 12;

$R_{15}$, and $R_{16}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

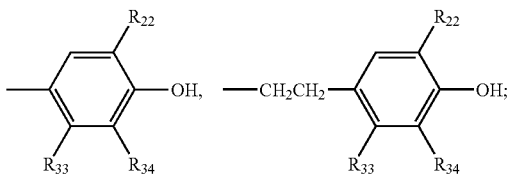

Radical A structures wherein * designates the position of attachment wherein at least one of $R_{15}$ or $R_{16}$ is an A radical; and wherein the ratio of the number of phosphorus atoms in the acidic phosphorus-containing compound to the number of basic nitrogen atoms in the basic organic compound is about 0.05 to about 2; and (C) at least one phenol-containing compound selected from compounds having one of the formulas:

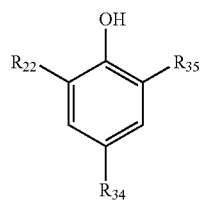
(27)

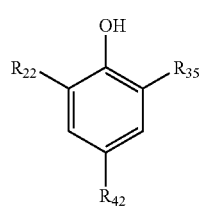
(28)

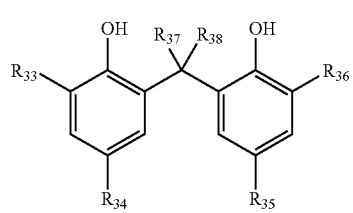
(29)

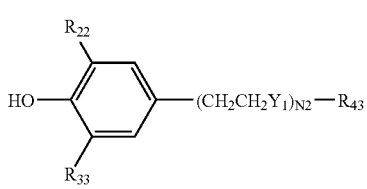
(30)

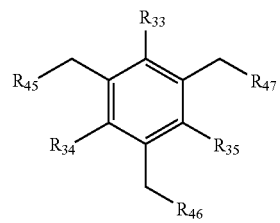
(31)

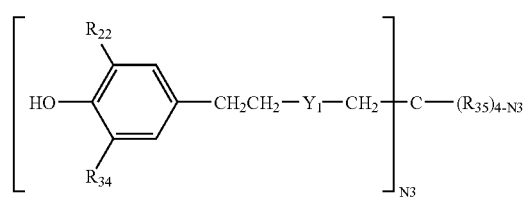
(32)

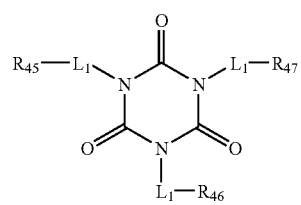
(33)

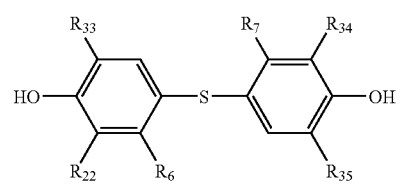
(34)

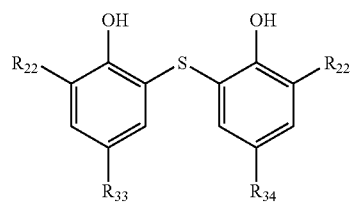
(35)

wherein $R_1$ is independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_6$ and $R_7$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_{22}$ is selected from $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{29}$ is selected from hydrogen, hydroxy and —$CO_2R_{30}$;

$R_{30}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, aryl, and heteroaryl;

$R_{33}$, $R_{34}$, $R_{35}$, $R_{36}$, $R_{37}$, and $R_{38}$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{42}$ is —$(CH_2CH_2$—$Y_1)_{N2}$—$R_{29}$;

$R_{43}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$;

$R_{44}$ is a group having one of the formulas:

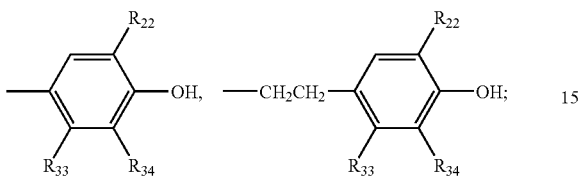

$R_{45}$, $R_{46}$ and $R_{47}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$ and at least one of $R_{45}$, $R_{46}$ or $R_{47}$ is —$R_{44}$;

$L_1$ is a divalent linking group selected from $C_2$-$C_{22}$-alkylene, —$(CH_2CH_2$—$Y_1)_{1-3}$—$CH_2CH_2$—, $C_3$-$C_8$-cycloalkylene, arylene, and —CO-$L_2$-OC—;

$L_2$ is selected from $C_1$-$C_{22}$-alkylene, arylene, —$(CH_2CH_2$—$Y_1)_{1-3}$—$CH_2CH_2$— and $C_3$-$C_8$-cycloalkylene;

$Y_1$ is selected from —OC(O)—, —NHC(O)—, —O—, —S—, and —N($R_1$)—;

N2 is a positive integer selected from 1 to about 20; and

N3 is a positive integer from 1 to 4.

11. A composition of claim 10 wherein the ratio of the number of phosphorus atoms in the acidic phosphorus-containing compounds to number of basic nitrogen atoms in the basic organic compounds is about 0.25 to about 1.1.

12. A polyolefin composition comprising:

(A) at least one polyethylene polymer containing from about 0.05 to about 200 ppmw of Fe, Ti, Co and/or Mn residues;

(B) about 0.01 to about 1.5 weight percent based on the total weight of the composition of at least one salt prepared by the reaction of phosphorous acid with a basic organic compound which contains nitrogen of the formula:

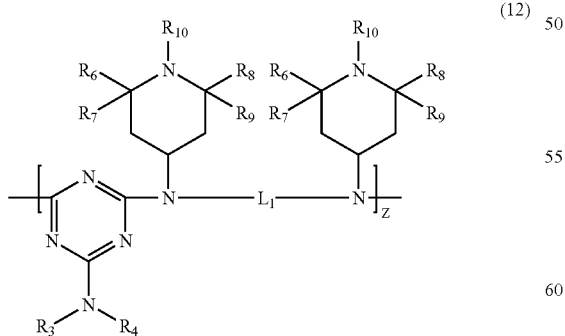

wherein $R_1$ is independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_3$ and $R_4$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ and $R_4$ is a substituent other than hydrogen; $R_3$ and $R_4$ may collectively represent a divalent group forming a ring with the nitrogen atom to which they are attached;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_{10}$ is selected from hydrogen and $C_1$-$C_{22}$-alkyl;

$L_1$ is a divalent linking group selected from $C_2$-$C_{22}$-alkylene, —$(CH_2CH_2$—$Y_1)_{1-3}$—$CH_2CH_2$—, $C_3$-$C_8$-cycloalkylene, arylene, and —CO-$L_2$-OC—;

$L_2$ is selected from $C_1$-$C_{22}$-alkylene, arylene, —$(CH_2CH_2$—$Y_1)_{1-3}$—$CH_2CH_2$— and $C_3$-$C_8$-cycloalkylene;

$Y_1$ is selected from —OC(O)—, —NHC(O)—, —O—, —S—, and —N($R_1$)—;

Z is a positive integer of up to about 6;

wherein the ratio of the number of phosphorus atoms in the acidic phosphorus-containing compound to the number of basic nitrogen atoms in the basic organic compound is about 0.05 to about 2; and (C) at least one phenol-containing compound selected from compounds having one of the formulas:

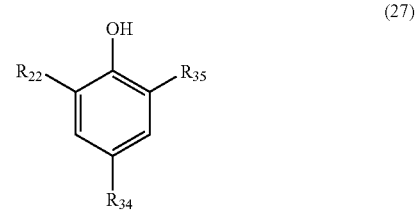

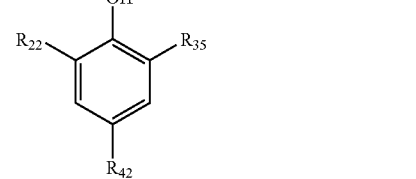

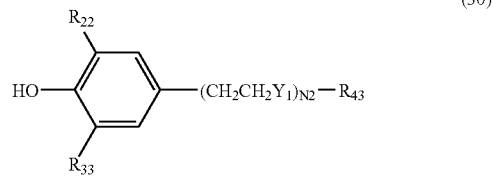

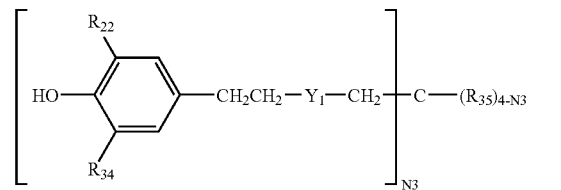

wherein $R_1$ is independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_{22}$ is selected from $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{33}$, $R_{34}$, and $R_{35}$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{43}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$R_{44}$;

$R_{44}$ is a group having one of the formulas $Y_1$ is selected from —OC(O)—, —NHC(O)—, —O—, —S—, and —N($R_1$)—;

N2 is a positive integer selected from 1 to about 20; and

N3 is a positive integer from 1 to 4.

13. The composition of claim 12 wherein the basic organic compound has formula 12 wherein $R_6$=$R_7$=$R_8$=$R_9$=$R_{10}$=methyl; $L_1$ is hexamethylene; and ($R_3$)($R_4$)N— collectively represent a morpholino group and wherein the ratio of the number of phosphorus atoms in the acidic phosphorus-containing compounds to number of basic nitrogen atoms in the basic organic compounds is about 0.25 to about 1.1.

14. The composition of claim 13 comprises about 0.05 to about 1.5 weight percent of the at least one salt, based on the total weight of the composition.

15. A polyolefin composition comprising:
(A) at least one polyolefin containing from about 0.05 to about 200 ppmw Fe, Ti, Co and/or Mn residues;
(B) about 0.05 to about 1.5 weight percent based on the total weight of the composition of at least one salt prepared by the reaction of one or more phosphorus-containing compounds selected from phosphorous acid, phosphoric acid and polyphosphoric acid with one or more basic organic compounds which contain nitrogen and have one of the formulas:

(12) 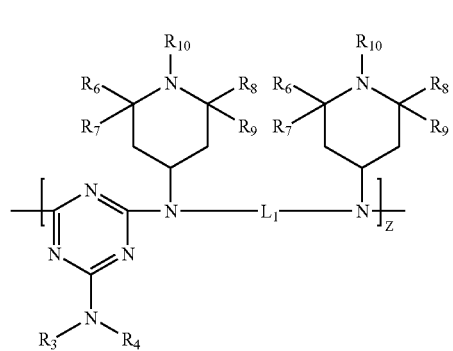
(13) 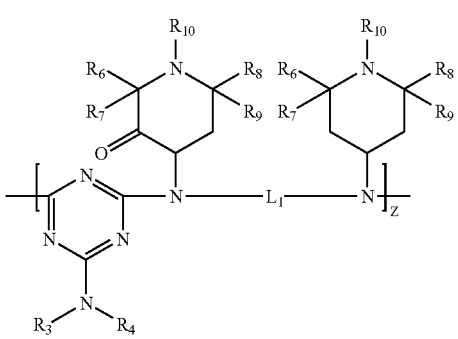
(14) 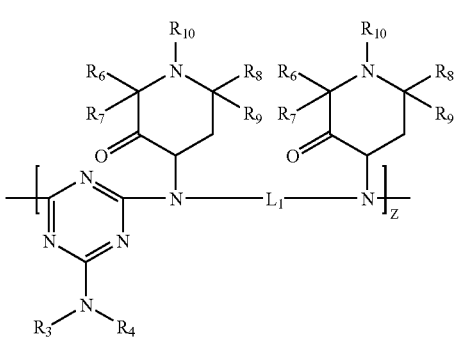
(15) 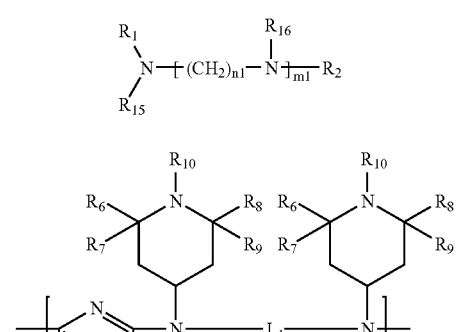
(16) 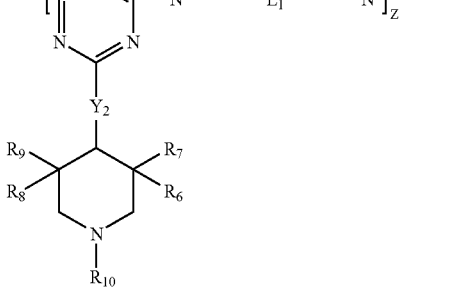
(17) 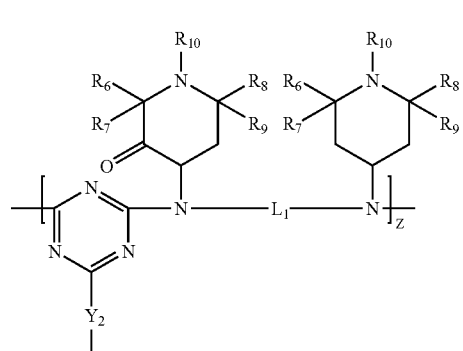
(18) 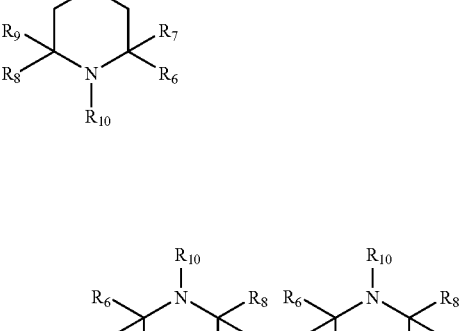
(19) 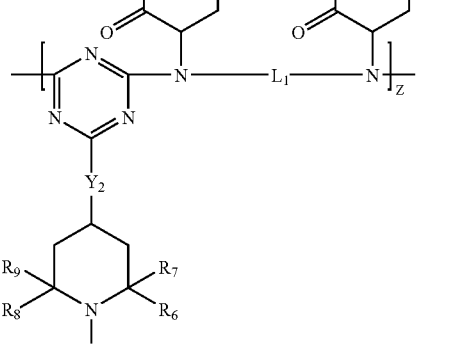
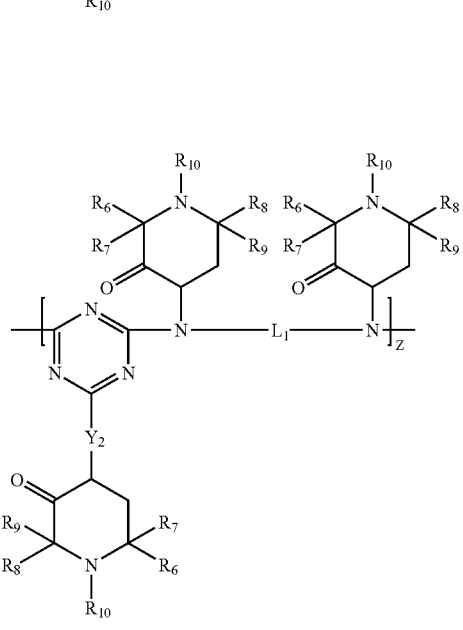

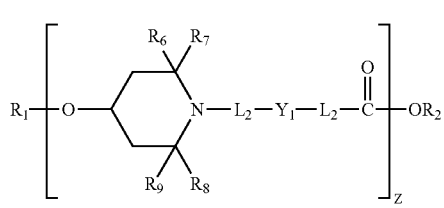

(20)

wherein
- $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$, $R_4$, and $R_5$ is a substituent other than hydrogen; $R_3$ and $R_4$ or $R_4$ and $R_5$ may collectively represent a divalent group forming a ring with the nitrogen atom to which they are attached;
- $R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;
- $R_{11}$ is selected from hydrogen; $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and a succinimido group having the formula

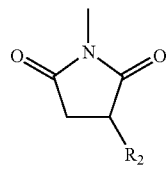

- $R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 2, 3 or 4 positions on the aromatic ring of formula (4);
- the —$N(R_3)(R_4)$ group may be located at the 2, 3 or 4 positions on the pyridine ring of formula (5);
- the —$CO_2R_3$ and $R_1$ groups may be located at any of the 2, 3, 4, 5, 6 positions of the pyridine ring of nitrogen of formula (6);
- $L_1$ is a divalent linking group selected from $C_2$-$C_{22}$-alkylene, —$(CH_2CH_2$—$Y_1)_{1-3}$—$CH_2CH_2$—, $C_3$-$C_8$-cycloalkylene, arylene, and —$CO$-$L_2$-$OC$—;
- $L_2$ is selected from $C_1$-$C_{22}$-alkylene, arylene, —$(CH_2CH_2$—$Y_1)_{1-3}$—$CH_2CH_2$— and $C_3$-$C_8$-cycloalkylene;
- $Y_1$ is selected from —$OC(O)$—, —$NHC(O)$—, —$O$—, —$S$—, and —$N(R_1)$—;
- $Y_2$ is selected from —$O$— and —$N(R_1)$—;
- $R_{13}$ and $R_{14}$ are independently selected from —$O$—$R_2$, and —$N(R_2)_2$;
- Z is a positive integer of up to about 20;
- m1, is selected from 0 to about 10;
- n1 is a positive integer selected from 2 to about 12;
- $R_{15}$, and $R_{16}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

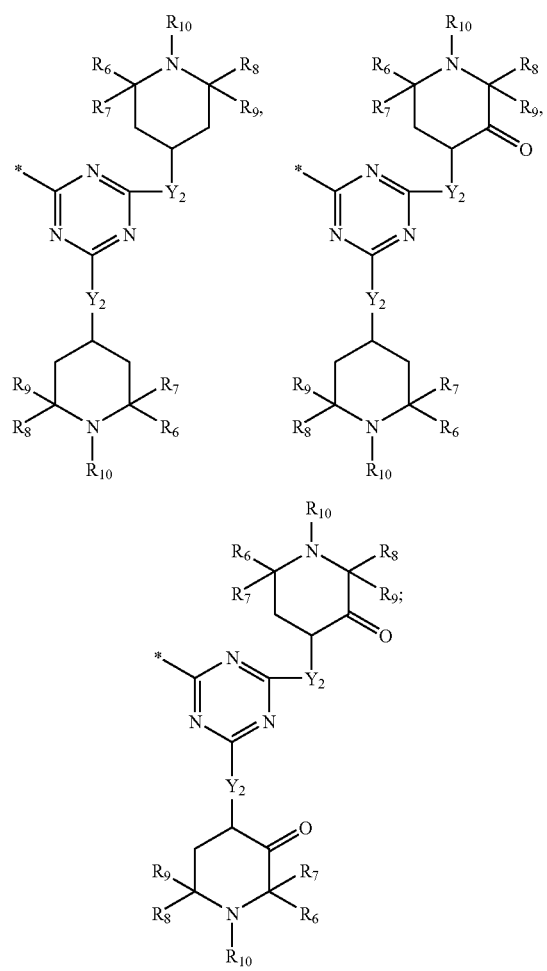

Radical A structures wherein * designates the position of attachment wherein the ratio of the number of phosphorus atoms in the acidic phosphorus-containing compound to the number of basic nitrogen atoms in the basic organic compound is about 0.05 to about 2; and (C) at least one ultraviolet light absorbing compound selected from compounds having one of the formulas:

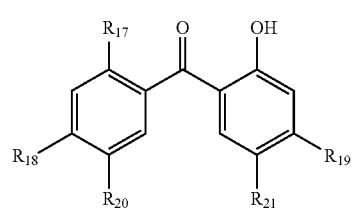

(21)

-continued

(22)
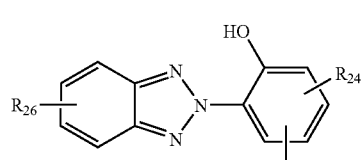

(23)
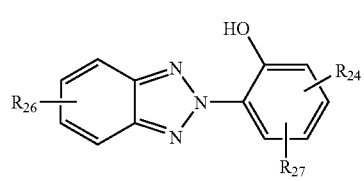

(24)
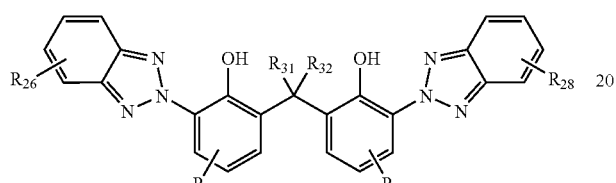

(25)
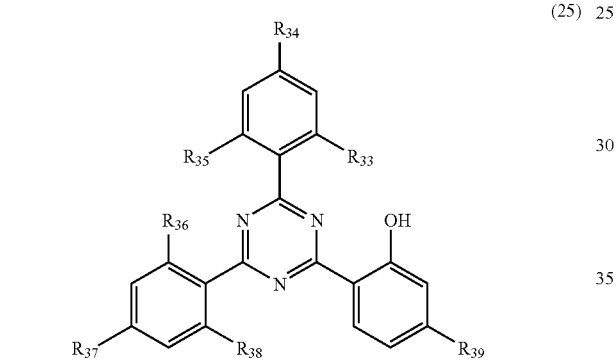

(26)
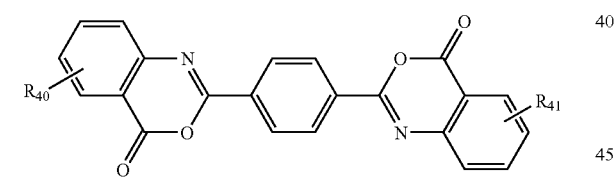

wherein $R_1$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_{17}$, $R_{18}$, and $R_{19}$ are independently selected from hydrogen, hydroxy, $C_1$-$C_{22}$-alkyl, substituted $C_1$-$C_{22}$-alkyl, $C_3$-$C_8$-cycloalkyl, substituted $C_3$-$C_8$-cycloalkyl and $OR_{22}$;

$R_{20}$ and $R_{21}$ are independently selected from hydrogen and —$SO_3R_{23}$;

$R_{22}$ is selected from $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{23}$ is selected from hydrogen, sodium, potassium, lithium, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{24}$ and $R_{25}$ are independently selected from hydrogen, $C_1$-$C_{22}$-alkyl, substituted $C_1$-$C_{22}$-alkyl, $C_3$-$C_8$-cycloalkyl and substituted $C_3$-$C_8$-cycloalkyl;

$R_{26}$ and $R_{28}$ are independently selected from hydrogen, halogen, $C_1$-$C_{22}$-alkyl, substituted $C_1$-$C_{22}$-alkyl, $C_3$-$C_8$-cycloalkyl and substituted $C_3$-$C_8$-cycloalkyl;

$R_{27}$ is selected from —$(CH_2CH_2$—$Y_1)_{N2}$—$CH_2CH_2$—$R_{29}$ and a group having one of the formulas

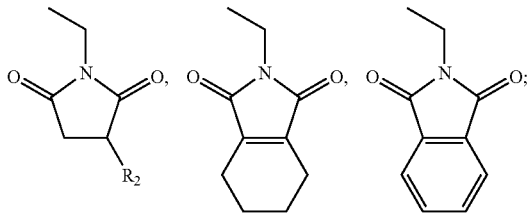

$Y_1$ is selected from —OC(O)—, —NHC(O)—, —O—, —S—, and —N($R_1$)—;

N2 is a positive integer selected from 1 to about 20;

$R_{29}$ is selected from hydrogen, hydroxy and —$CO_2R_{30}$;

$R_{30}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, aryl, and heteroaryl;

$R_{31}$ and $R_{32}$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{33}$, $R_{34}$, $R_{35}$, $R_{36}$, $R_{37}$, and $R_{38}$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{39}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl and —$OR_{30}$; and $R_{40}$ and $R_{41}$ are independently selected from hydrogen, $C_1$-$C_{22}$-alkyl, substituted $C_1$-$C_{22}$-alkyl, $C_3$-$C_8$-cycloalkyl and substituted $C_3$-$C_8$-cycloalkyl.

16. A polyolefin composition comprising:

(A) at least one polyolefin containing from about 0.05 to about 200 ppmw Fe, Ti, Co and/or Mn residues;

(B) about 0.05 to about 1.5 weight percent based on the total weight of the composition of at least one salt prepared by the reaction of one or more phosphorus-containing compounds selected from phosphorous acid, phosphoric acid and polyphosphoric acid with one or more basic organic compounds which contain nitrogen and have the formulas:

(12)
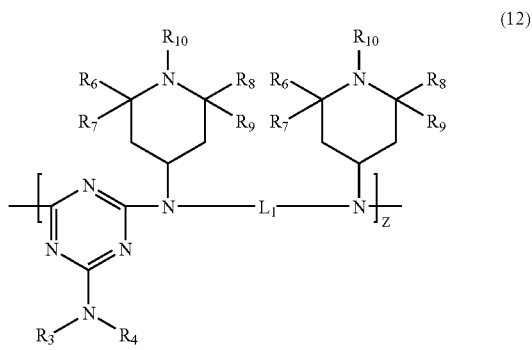

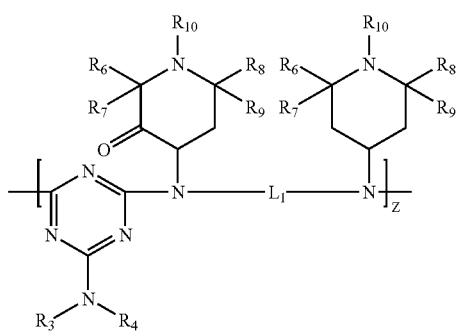
(13)
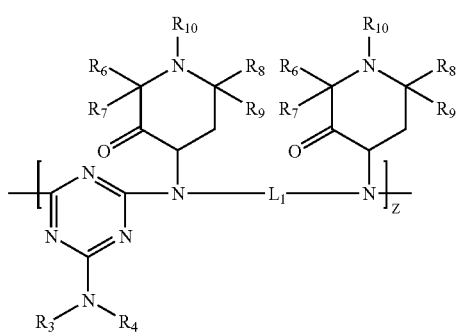
(14)
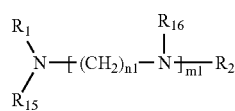
(15)
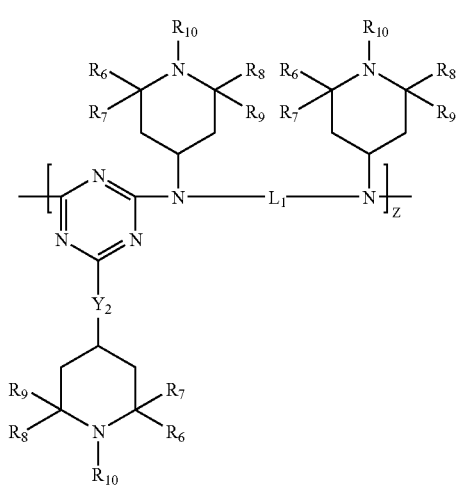
(16)
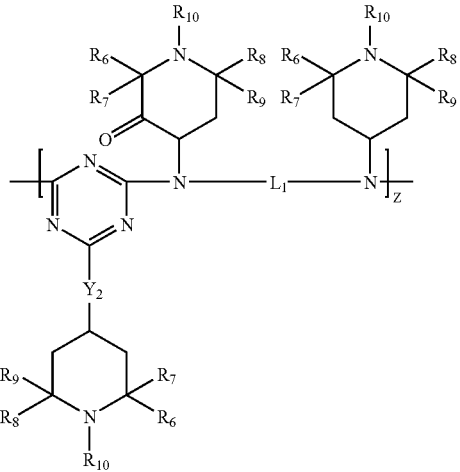
(17)
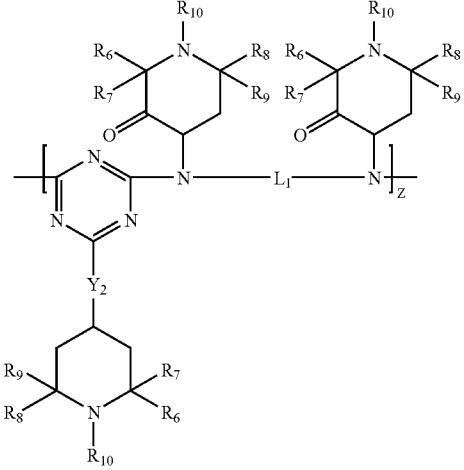
(18)
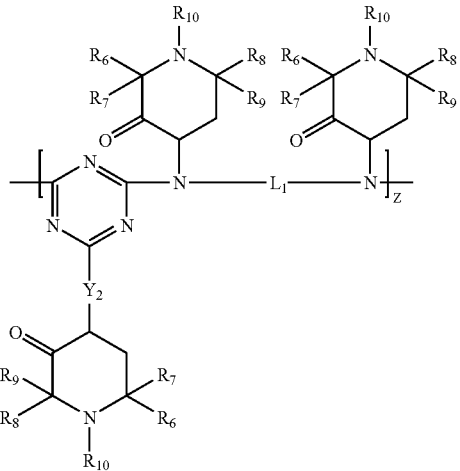
(19)

-continued (20)

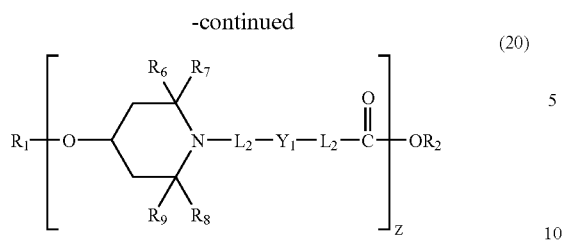

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_3$ and $R_4$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ and $R_4$ is a substituent other than hydrogen; $R_3$ and $R_4$ may collectively represent a divalent group forming a ring with the nitrogen atom to which they are attached;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_{10}$ is selected from hydrogen and $C_1$-$C_{22}$-alkyl;

$L_1$ is a divalent linking group selected from $C_2$-$C_{22}$-alkylene, —(CH$_2$CH$_2$—Y$_1$)$_{1-3}$—CH$_2$CH$_2$—, $C_3$-$C_8$-cycloalkylene, arylene, and —CO-L$_2$-OC—;

$L_2$ is selected from $C_1$-$C_{22}$-alkylene, arylene, —(CH$_2$CH$_2$—Y$_1$)$_{1-3}$—CH$_2$CH$_2$— and $C_3$-$C_8$-cycloalkylene;

$Y_1$ is selected from —OC(O)—, —NHC(O)—, —O—, —S—, and —N(R$_1$)—;

$Y_2$ is selected from —O— and —N(R$_1$)—;

Z is a positive integer of up to about 6;

$m_1$, is selected from 0 to about 10;

n1 is a positive integer selected from 2 to about 12;

wherein at least one $R_{15}$, and $R_{16}$ represents Radical A wherein Radical A is selected from the following structures:

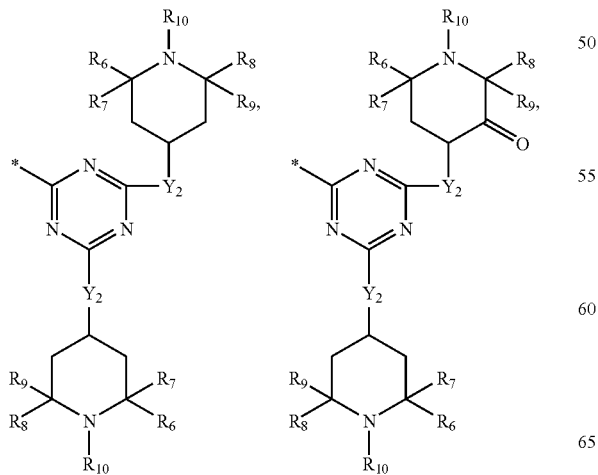

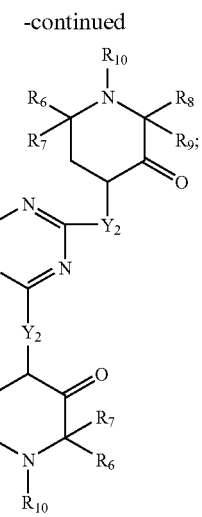

Radical A structures wherein * designates the position of attachment and wherein the ratio of the number of phosphorus atoms in the acidic phosphorus-containing compound to the number of basic nitrogen atoms in the basic organic compound is about 0.05 to about 1.2; and (C) at least one ultraviolet light absorbing compound or phenolic antioxidant compound selected from compounds having one of the formulas:

(21)

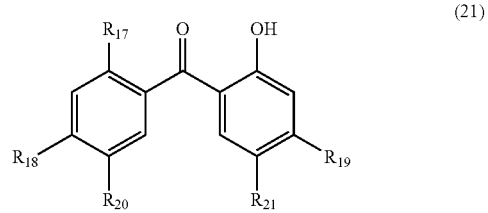

(22)

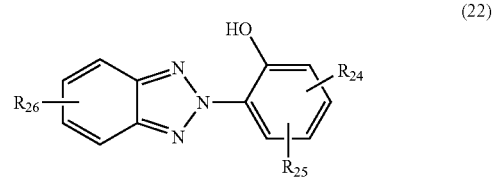

(23)

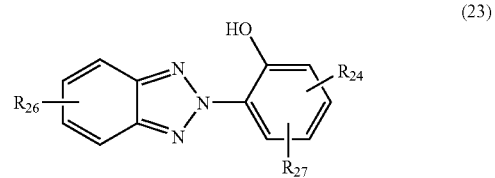

(24)

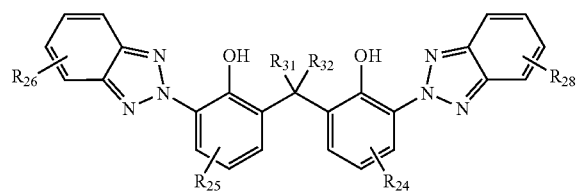

-continued

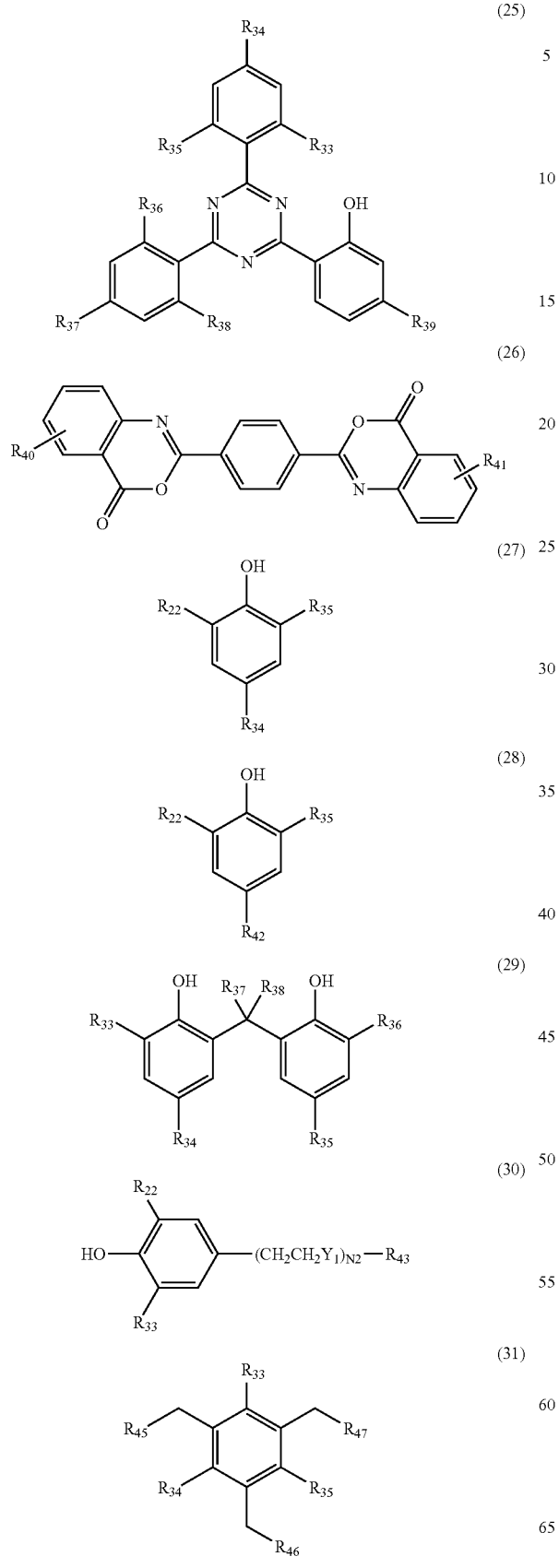

wherein $R_1$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_{17}$, $R_{18}$, and $R_{19}$ are independently selected from hydrogen, hydroxy, $C_1$-$C_{22}$-alkyl, substituted $C_1$-$C_{22}$-alkyl, $C_3$-$C_8$-cycloalkyl, substituted $C_3$-$C_8$-cycloalkyl and $OR_{22}$;

$R_{20}$ and $R_{21}$ are independently selected from hydrogen and —$SO_3R_{23}$;

$R_{22}$ is selected from $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{23}$ is selected from hydrogen, sodium, potassium, lithium, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{24}$ and $R_{25}$ are independently selected from hydrogen, $C_1$-$C_{22}$-alkyl, substituted $C_1$-$C_{22}$-alkyl, $C_3$-$C_8$-cycloalkyl and substituted $C_3$-$C_8$—;

$R_{26}$ and $R_{28}$ are independently selected from hydrogen, halogen, $C_1$-$C_{22}$-alkyl, substituted $C_1$-$C_{22}$-alkyl, $C_3$-$C_8$-cycloalkyl and substituted $C_3$-$C_8$-cycloalkyl;

$R_{27}$ is selected from —$(CH_2CH_2$—$Y_1)_{N2}$—$CH_2CH_2$—$R_{29}$ and a group having one of the formulas

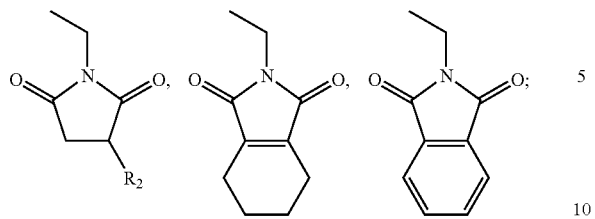

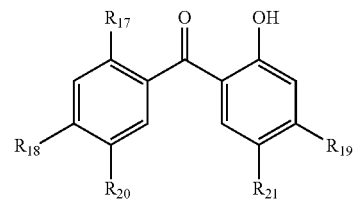

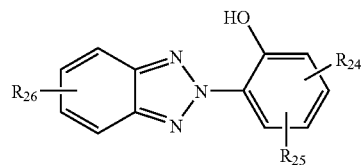

R$_{29}$ is selected from hydrogen, hydroxy and —CO$_2$R$_{30}$;

R$_{30}$ is selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, aryl, and heteroaryl;

R$_{31}$ and R$_{32}$ are independently selected from hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{33}$, R$_{34}$, R$_{35}$, R$_{36}$, R$_{37}$, and R$_{38}$ are independently selected from hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{39}$ is selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl and —OR$_{30}$;

R$_{40}$ and R$_{41}$ are independently selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl and may be located at the 5, 5', 6, 6', 7, 7', 8 or 8' positions on the aromatic ring, respectively;

R$_{42}$ is —(CH$_2$CH$_2$—Y$_1$)$_{N2}$—R$_{29}$;

R$_{43}$ is selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl and —R$_{44}$;

R$_{44}$ is a group having one of the formulas

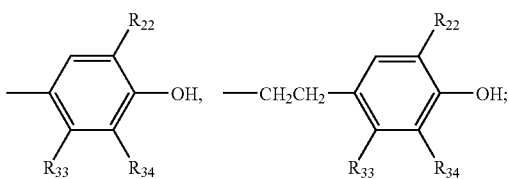

R$_{45}$, R$_{46}$ and R$_{47}$ are independently selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl and —R$_{44}$ and at least one of R$_{45}$, R$_{46}$ or R$_{47}$ is —R$_{44}$;

L$_1$ is a divalent linking group selected from C$_2$-C$_{22}$-alkylene, —(CH$_2$CH$_2$—Y$_1$)$_{1-3}$—CH$_2$CH$_2$—, C$_3$-C$_8$-cycloalkylene, arylene, and —CO-L$_2$-OC—;

L$_2$ is selected from C$_1$-C$_{22}$-alkylene, arylene, —(CH$_2$CH$_2$—Y$_1$)$_{1-3}$—CH$_2$CH$_2$— and C$_3$-C$_8$-cycloalkylene;

Y$_1$ is selected from —OC(O)—, —NHC(O)—, —O—, —S—, and —N(R$_1$)—;

N2 is a positive integer selected from 1 to about 20; and

N3 is an positive integer from 1 to 4.

17. The polyolefin composition of claim 16 wherein said ultraviolet light absorbing compound is selected from one of the following formulas:

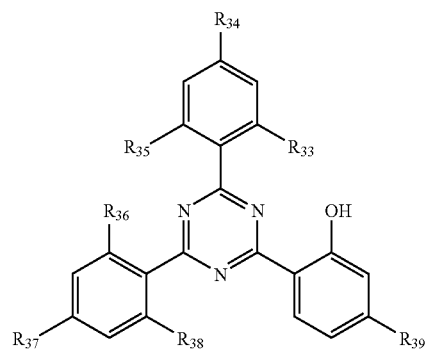

wherein

R$_{17}$, R$_{18}$, and R$_{19}$ are independently selected from hydrogen, hydroxy, C$_1$-C$_{22}$-alkyl, substituted C$_1$-C$_{22}$-alkyl, C$_3$-C$_8$-cycloalkyl, substituted C$_3$-C$_8$-cycloalkyl and OR$_{22}$;

R$_{20}$ and R$_{21}$ are independently selected from hydrogen and —SO$_3$R$_{23}$;

R$_{22}$ is selected from C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{23}$ is selected from hydrogen, sodium, potassium, lithium, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{24}$ and R$_{25}$ are independently selected from hydrogen, C$_1$-C$_{22}$-alkyl, substituted C$_1$-C$_{22}$-alkyl, C$_3$-C$_8$-cycloalkyl and substituted C$_3$-C$_8$—;

R$_{26}$ is independently selected from hydrogen, halogen, C$_1$-C$_{22}$-alkyl, substituted C$_1$-C$_{22}$-alkyl, C$_3$-C$_8$-cycloalkyl and substituted C$_3$-C$_8$-cycloalkyl;

R$_{33}$, R$_{34}$, R$_{35}$, R$_{36}$, R$_{37}$, and R$_{38}$ are independently selected from hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl; and R$_{39}$ is selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl and —OR$_{30}$.

18. The polyolefin composition of claim 17 wherein said ultraviolet light absorbing compound is selected from the following formula:

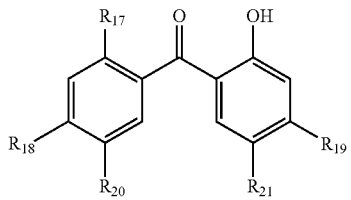

(21)

wherein

R$_{17}$, R$_{18}$, and R$_{19}$ are independently selected from hydrogen, hydroxy, C$_1$-C$_{22}$-alkyl, substituted C$_1$-C$_{22}$-alkyl, C$_3$-C$_8$-cycloalkyl, substituted C$_3$-C$_8$-cycloalkyl and OR$_{22}$;

R$_{20}$ and R$_{21}$ are independently selected from hydrogen and —SO$_3$R$_{23}$;

R$_{22}$ is selected from C$_1$-C$_{22}$-alkyl, substituted C$_1$-C$_{22}$-alkyl, C$_3$-C$_8$-cycloalkyl, and substituted C$_3$-C$_8$-cycloalkyl; and R$_{23}$ is selected from hydrogen, sodium, potassium, lithium, C$_1$-C$_{22}$-alkyl, substituted C$_1$-C$_{22}$-alkyl, C$_3$-C$_8$-cycloalkyl, and substituted C$_3$-C$_8$-cycloalkyl.

19. The polyolefin composition of claim 18 wherein R$_{17}$=R$_{18}$=R$_{20}$=R$_{21}$=hydrogen, and R$_{19}$=—OC$_8$H$_{17}$.

20. The polyolefin composition of claim 16 wherein said phenolic antioxidant is selected from the following formulas:

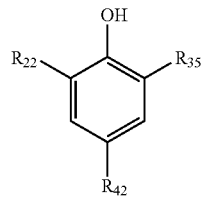

(27)

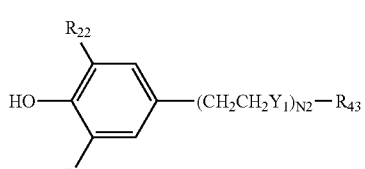

(28)

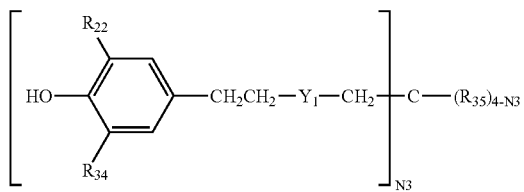

(30)

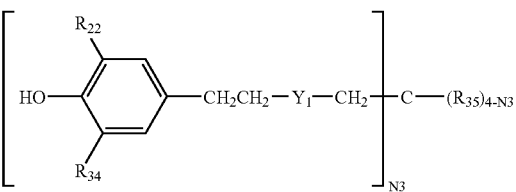

(32)

wherein

R$_1$ is independently selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_{22}$ is selected from C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{33}$, R$_{34}$, and R$_{35}$ are independently selected from hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{43}$ is selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl and —R$_{44}$;

R$_{44}$ is a group having one of the formulas

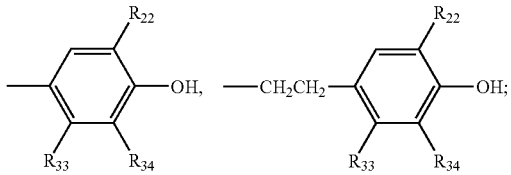

Y$_1$ is selected from —OC(O)—, —NHC(O)—, —O—, —S—, —N(R$_1$)—;

N2 is a positive integer selected from 1 to about 20; and

N3 is a positive integer from 1 to 4.

21. The polyolefin composition of claim 20 wherein at least one phenolic antioxidant is selected from the formula:

(32)

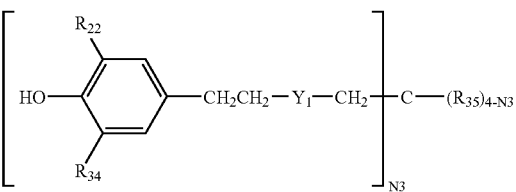

wherein

R$_1$ is independently selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_{22}$ is selected from C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{34}$ and R$_{35}$ are independently selected from hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl;

Y$_1$ is selected from —OC(O)—, —NHC(O)—, —O—, —S—, and —N(R$_1$)—; and

N3 is an positive integer from 1 to 4.

22. The polyolefin composition of claim 21 wherein N3=4, R$_{22}$=R$_{34}$=—C(CH$_3$)$_3$ and Y$_1$=—OC(O)—.

23. The composition according to claims 1, 2, 15, and 17 further comprising a white pigment selected from the group consisting of titanium dioxide, zinc oxide, and barium sulfate.

24. The composition of claim 23 wherein the white pigment is titanium dioxide.

25. The composition according to claim 1, which comprises from about 0.05 to 1.5 weight percent of said salt, based on the total weight of the composition.

* * * * *

UNITED STATES PATENT AND TRADEMARK OFFICE
CERTIFICATE OF CORRECTION

PATENT NO. : 7,338,992 B2  
APPLICATION NO. : 11/204864  
DATED : March 4, 2008  
INVENTOR(S) : Pearson et al.

Page 1 of 1

It is certified that error appears in the above-identified patent and that said Letters Patent is hereby corrected as shown below:

Title Page; item (63);  
Correction(s)

Related U.S. Application Data is missing. Please add the following:

--Related U.S. Application Data  
Continuation-in-part of application No. 10/379,783, filed 03/05/2003 abandoned--

Signed and Sealed this

Fifth Day of May, 2009

JOHN DOLL  
*Acting Director of the United States Patent and Trademark Office*